(12) United States Patent
Dasilveira

(10) Patent No.: US 12,494,645 B2
(45) Date of Patent: Dec. 9, 2025

(54) LOW VOLTAGE HOT TO HOT TIMER

(71) Applicant: ASCO Power Technologies, L.P., Florham Park, NJ (US)

(72) Inventor: Ricardo Dasilveira, Rahway, NJ (US)

(73) Assignee: ASCO Power Technologies, L.P., Florham Park, NJ (US)

( * ) Notice: Subject to any disclaimer, the term of this patent is extended or adjusted under 35 U.S.C. 154(b) by 0 days.

(21) Appl. No.: 18/634,359

(22) Filed: Apr. 12, 2024

(65) Prior Publication Data

US 2025/0323503 A1    Oct. 16, 2025

(51) Int. Cl.
*H02J 3/00* (2006.01)
*H02J 3/14* (2006.01)

(52) U.S. Cl.
CPC .............. *H02J 3/008* (2013.01); *H02J 3/007* (2020.01); *H02J 3/14* (2013.01)

(58) Field of Classification Search
CPC .............. H02J 3/008; H02J 3/007; H02J 3/14
USPC .......................................................... 307/18
See application file for complete search history.

(56) References Cited

U.S. PATENT DOCUMENTS

| 9,720,476 | B1 | 8/2017 | Nguyen et al. | |
|---|---|---|---|---|
| 2012/0109553 | A1* | 5/2012 | Hancock | G01R 31/42 702/62 |
| 2012/0235512 | A1 | 9/2012 | Siciliano et al. | |
| 2016/0322864 | A1 | 11/2016 | Tomassi et al. | |
| 2018/0173180 | A1* | 6/2018 | Frampton | F04B 39/0044 |

FOREIGN PATENT DOCUMENTS

WO    WO 2023/024846 A1    3/2023

OTHER PUBLICATIONS

Instruction Manual for Solid State Digital Timer Model SST-9203, Copyright Avo Multi-Amp Corporation, 1992, 93, 94, 23 pages.
Extended European Search Report dated Oct. 1, 2025 in connection with European Application No. 25169562.3.
[No Author Listed], Transfer Switches ATC Controllers. ATC-800 Controller-General Description. Taylor Power Systems. Sep. 2011. 5 pages.

* cited by examiner

*Primary Examiner* — Michael R. Fin
(74) *Attorney, Agent, or Firm* — Wolf, Greenfield & Sacks, P.C.

(57) ABSTRACT

A computer-implemented method and system are provided to measure a time of a load transfer for an electrical system. A selection of a transfer mode is received, such as a closed or open transition transfer mode. Electrical signals from sensing leads or signals derived therefrom are monitored to sense a supply state of power from first and second power sources on the electrical system to a load. The sensing leads are connectable or couplable to the electrical system or a component thereof according to the transfer mode being implemented. An occurrence of a contact lift and an occurrence of a contact landing, which are associated with a load transfer operation, are identified from the monitored electrical signals or signals derived therefrom. A load transfer time is measured based on a timing of the identified occurrences of the contact lift and landing, and the selected transfer mode, and outputted.

22 Claims, 13 Drawing Sheets

LOW VOLTAGE HOT TO HOT TIMER

FIELD

The present disclosure is generally directed to load transfers in an electrical system, and more specifically to a method and system to measure a time for a load transfer operation implemented by or through a transfer switch or the like in an electrical system.

BACKGROUND

To obtain an accurate load transfer measurement on an electrical system, a trained technician can use an expensive timing box or equipment, such as an oscilloscope, and follow certain procedures to set up and perform a time measurement for a load transfer on the electrical system. However, such procedures can be very manual and labor intensive, can be potentially dangerous, and can result in inaccurate measurements.

SUMMARY

In accordance with an embodiment, a method and system are provided to measure a hot-to-hot load transfer time for a transfer switch on an electrical system including a first power source, a second power source and a load. The transfer switch is configured to transfer supply of power to the load from one of the first and second power sources to the other one of the first and second power sources. The method and system involves: receiving, at a controller, a selection of a transfer mode to be implemented by or through the transfer switch from a plurality of different types of transfer modes, the different types of transfer modes including at least a closed transition transfer mode and an open transition transfer mode; monitoring, via the controller, electrical signals from first and second sensing leads or signals derived therefrom to sense a supply state of electrical power from the first and second power sources to the load, each of the first and second sensing leads being connectable or couplable to the electrical system or a component thereof according to the transfer mode being implemented by or through the transfer switch; identifying, via the controller, an occurrence of a contact lift and an occurrence of a contact landing, which are associated with a load transfer operation of the transfer switch, from the monitored electrical signals or signals derived therefrom, the contact lift being an operation of the transfer switch which disconnects one of the first and second powers from the load, the contact landing being an operation of the transfer switch which connects the other one of the first and second powers to the load; measuring, via the controller, a load transfer time based on a timing of the identified occurrence of the contact lift and the identified occurrence of the contact landing, and the selected transfer mode; and outputting via the controller the measured load transfer time.

In various embodiments, for the closed transition transfer mode, one of the first and second sensing leads is connected or coupled to one of the first and second power sources and the other one of the first and second sensing leads is connected or coupled to the other one of the first and second power sources.

In various embodiments, for the closed transition transfer mode, the measured load transfer time is a time period from the identified occurrence of contact landing to the identified occurrence of the contact lift. The contact landing is identified as a first signal transition or edge signal from the electrical signals or signals derived therefrom being monitored over time and at or above a defined signal time length when one of the first and second power sources is connected to the load, and after the contact landing. The contact lift is subsequently identified as a last signal transition or edge signal from the electrical signals or signals derived therefrom being monitored over time and at or above the defined signal time length when the other one of the first and second power sources is disconnected from the load.

In various embodiments, for the open transition transfer mode, one of the first and second sensing leads is connected or coupled to one of the first and second power sources and the other one of the first and second sensing leads is connected or coupled to the load.

In various embodiments, for the open transition transfer mode, the measured load transfer time is a time period from the identified occurrence of the contact lift to the identified occurrence of the contact landing. The contact lift is identified as a last signal transition from the electrical signals being monitored over time and at or above a defined signal time length when one of the first and second power sources, which is connected to the load, is disconnected from the load, and after the contact lift. The contact landing is subsequently identified as a first signal transition from the electrical signals being monitored over time and at or above the defined signal time length when the other one of the first and second power sources is connected to the load.

In various embodiments, the monitored electrical signals from the first and second sensing leads or signals derived therefrom correspond to or represent a potential voltage difference across the first and send sensing leads.

In various embodiments, the method and system can further involve filtering the monitored electrical signals or signals derived therefrom to filter out signals below a defined signal time length or a signal time length of 40 µ-sec. The identifying an occurrence of a contact lift and an occurrence of a contact landing ignores signals associated with contact bounce from the monitored electrical signals or signals derived therefrom when identifying for an occurrence of a contact landing and ignores signals associated with contact chatter when identifying for a contact lift.

In various embodiments, an order in which the identifying identifies the occurrence of the contact lift and the occurrence of the contact landing is changed according to the selected transfer mode.

In accordance with embodiments, a non-transitory computer medium storing computer executable code, which when executed by one or more processors, can implement a method as described herein.

It is to be understood that both the foregoing general description and the following detailed description are exemplary and explanatory only and are not restrictive of the invention, as disclosed or claimed. The claims should be entitled to their full breadth of scope, including equivalents.

DESCRIPTION OF THE FIGURES

The description of the various example embodiments is explained in conjunction with the appended drawings.

DISCUSSION OF EXAMPLE EMBODIMENTS

Figure 1:
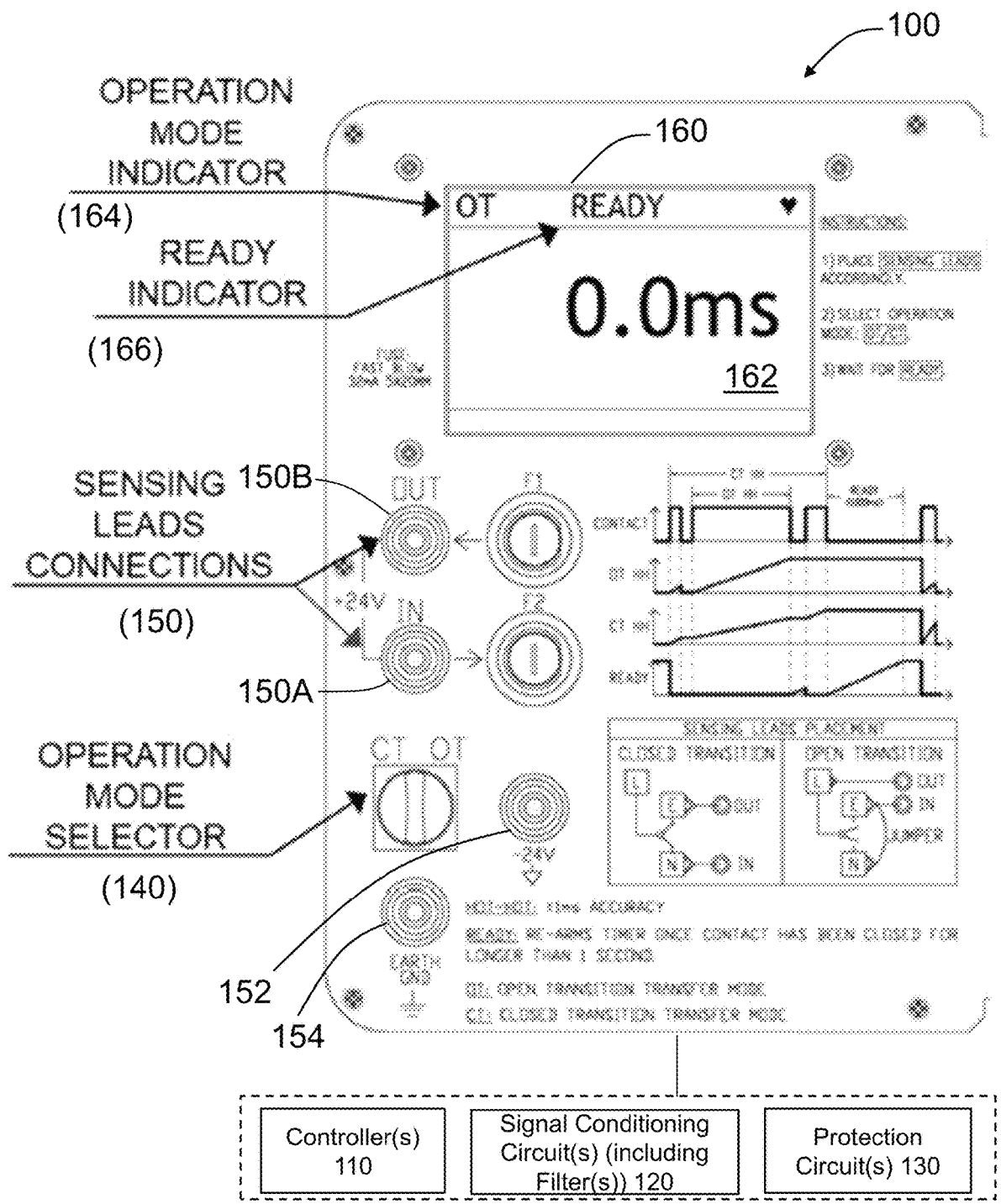
FIG. 1 is a diagram of an example hot-to-hot load transfer timer for implementing a time measurement(s) for a load transfer operation(s) by or through a transfer switch on an electrical system, in accordance with embodiments of the present disclosure.

In accordance with embodiments of the present disclosure, a method and system are provided for measuring a load transfer time of a load transfer operation performed by or through a transfer switch from one power source to another power source on an electrical system. The time (or "timing") measurement is performed by or through a timing device (also referred to as a "timer"). The time measurement can be performed by the timing device automatically or manually (e.g., in response to a user command, etc.). The timing device can be compatible for use with different types of transfer modes, including "open transition" and "closed transition" transfer switch types.

As used herein, in the context of load transfer, "open transition", "OT" or "open transition transfer mode" refers to a load transfer scenario where an initial power source(s) is connected to a load, the initial power source(s) is then disconnected from the load, and thereafter a subsequent power source(s) is connected to the load to complete the transfer operation.

As used herein, in the context of load transfer, "closed transition", "CT" or "closed transition transfer mode" refers to a load transfer scenario where an initial power source(s) is connected to a load, a subsequent power source(s) is then connected to the load, and thereafter the initial power source(s) is disconnected from the load to complete the transfer operation. The initial power source(s) and the subsequent power source(s) are briefly connected at the same time to the load during the transfer operation. This brief overlap can limit or remove momentary stutter in power which may occur in an OT-type system.

As used herein, a "transfer switch" refers to a transfer switch, transfer switch device, transfer switch system or any device or system which facilitates the transfer of a supply of power to a load(s) from one power source to another power source. Examples of a transfer switch can include but is not limited to an automatic transfer switch (ATS), power transfer switch, or a transfer switch which can shift a load(s) from one electrical power source(s) to another electrical power source(s). The power sources can include a utility or feed thereof, a generator, a battery, a utility backup or feed thereof, a normal power source, emergency power source, or other electrical power source(s) capable of supplying electrical power to a load(s).

In the method and system, the timing device can monitor electrical signals through sensing leads, which are connected or coupled to the electrical system or component thereof, to sense (or detect) a supply state of electrical power from power sources to a load(s). By monitoring the electrical signals or signals derived therefrom, the timing device can identify an occurrence of a contact lift and an occurrence of a contact landing, which are associated with a load transfer operation by or through a transfer switch on the electrical system. The contact lift is an operation of the transfer switch which disconnects a power source from the load. The contact landing is an operation of the transfer switch which connects a power source to the load.

For an OT transfer mode, the time measurement for the transfer operation is a time from the contact lift to the contact landing; for a CT transfer mode, the time measurement for the transfer operation is a time from the contact landing to the contact lift. However, the operation of a contact lift or contact landing may have associated therewith mechanical contact bouncing (e.g., contact chatter and contact bounce), which may impact the accuracy in identifying an occurrence of a contact lift and/or a contact landing, and thus, may impact an accuracy of a time measurement for a load transfer operation. Accordingly, in various embodiments, to improve the accuracy of the time measurements, the timing device can employ filtering techniques, in hardware or software, to remove or ignore noisy signals, from the monitored electrical signals or signals derived therefrom, which represent such contact mechanical bounce to identify more accurately the timing of a contact lift and a contact landing, which in turn can provide a more accurate time measurement of the transfer operation. In various embodiments, the timing device also can employ filter(s), such as low-pass filter(s), to filter out signals (e.g., noise) below a predefined signal time length (e.g., below 40 µ-sec) from the monitored electrical signals or signals derived therefrom, across the sensing leads.

In various embodiments, the timing device also can include protection circuit(s) or other safety protection devices to prevent out-of-specification usage of the timing device (e.g., usage beyond a predefined electrical rating or thresholds). The protection circuit(s) can include protection or protective circuit(s) (e.g., surge protection circuit, high voltage protection circuit, high current protection circuit, fuses, etc.). In various embodiments, the timing device is provided as a low voltage timing device, which can employ low voltage electrical components for performing various functions and features of the timing device, such as described herein.

The method and system of the present disclosure can provide for various technical benefits and improvements. For example, the timing device can be configured to perform a hot-to-hot timing measurement for a load transfer operation with an accuracy within less than 1 millisecond. The timing device can be compatible for use in performing time measurements for different types of transfer modes or transition connections (e.g., CT transfer mode, OT transfer mode, etc.) The timing device also can be manufactured using low cost components (e.g., hardware, software, etc.) to provide a cost-effective means of measuring a time for a transfer load operation(s). As such, there is less of a need to share measurement equipment particularly high cost equipment; instead, timing devices can be made available and maintained, for example, in testing stations in manufacturing, industrial and other facilities or plants for testing a load transfer operation(s) and equipment associated therewith. Furthermore, the timing device can also provide a "plug-and-play" time measurement method and system, which is easy to use and does not require the need for specialized/trained labor and/or expensive equipment (e.g., oscilloscope, etc.). For instances, in some example embodiments, the timing device can speed up testing since configuration is a simple turn of a switch to select a transfer mode from a plurality of different transfer modes. The timing device also can include safety features, such use protection circuit(s), to minimize the risk of fire in case of out-specification usage conditions.

These and other example embodiments of the method, system and device are described in further detail below with reference to the figures.

FIG. 1 is a diagram of an example timing device 100 (also referred herein as "timer" 100) for measuring a load transfer operation by or through a transfer switch in an electrical system, such as a power distribution system with a plurality of power sources and a load(s), in accordance with embodiment. As shown in FIG. 1, the timer 100 can include a controller 110, signal conditioning circuit(s) 120, protection circuit(s) 130, input device(s) such as an operation mode selector 140 and sensing leads (and connections thereto (or connectors)) 150, and an output device(s) such as a display 160. In this example, the timer 100 is a hot-to-hot timing device, which is configured to measure a time for a load transfer operation such as for example performed by or through the transfer switch from one electrical power source to another electrical power source. The electrical components of the timer 100 can be connected across a bus/wiring system or subsystems.

The operation mode selector 140 can be a user device, which is configured to enable a user to select a transfer mode from a plurality of transfer modes. In this example, the plurality of transfer modes can include an open transition (OT) transfer mode, and a closed transition (CT) transfer mode, which are to be implemented through a transfer switch on the electrical system to perform a load transfer operation. In this example, the selector 140 is a user operable switch or switching device.

The sensing leads and their connectors, referred generally as 150, are configured to provide for interconnection to an electrical system to be monitored. The sensing leads are connected so as to receive electrical signals, which can represent or reflect a supply state of power from the plurality of power sources, e.g., a first power source and a second power source, to the load, across the transfer switch (or components thereof). In this example, the sensing leads/connectors 150 can include an input sensing lead/connector 150A and an output sensing lead/connector 150B. The connection configuration for the sensing leads 150A and 150B are based on the type of transfer mode to be implemented on the electrical system, e.g., open transition (OT) transfer mode or a closed transition (CT) transfer mode.

By way of example, for a CT transfer mode, the sensing lead 150A can be connected/coupled to a first power source (e.g., normal power source) to monitor the supply of power from the first power source to the load, and the sensing lead 150B can be connected/coupled to a second power source (e.g., emergency power source) to monitor the supply of power from the second power source to the load. For an OT transfer mode, the sensing lead 150A can be connected/coupled to the second power source (where a jumper connection is provided to couple to the first power source), and the sensing lead 150B can be connected/coupled to the load to monitor the supply of power from the first and second power sources to the load. Example connection configurations are described in greater detail below with reference to the example in FIG. 2.

The signal conditioning circuit(s) 120 can include filter(s) and other signal conditioning circuitry for processing the electrical signals received and monitored on the sensing leads 150. In various embodiments, the filter(s) can include a low-pass filter(s) for filtering out signals (e.g., noise or noisy signals) from the electrical signals received from the sensing leads 150A, 150B, which are below a defined signal time signal length, such as for example 40 μ-sec. The signal conditioning circuit(s) can include other signal conditioning circuitry (e.g., amplifier(s), inverter(s), Schmitt trigger, etc.) according to the desired specification for the timing measurement application.

The protection circuit(s) 130 can include circuits to protect the timer 100 and its components from usage beyond the timer-usage specification, e.g., electrical specification or ratings of the timer or its components. For example, the protection circuit(s) can include surge, overcurrent and/or overvoltage protection circuit(s), or other protection circuits. The protection circuit(s) 130 can be connected to protect against surge, overvoltage or overcurrent on or from the sensing leads 150, power supply (or components thereof) or other electrical systems on the timer 100. For example, overvoltage protection can be provided to protect against high voltage.

The display (or display device) 160 can be configured to output various types of information, which are relevant to time measurement and operation of the timer. The display 160 can include a main window 162 for displaying a time measurement of a load transfer, an operation mode indicator 164 for indicating a selected transfer mode (e.g., OT or CT), and an operation status indicator for indicating whether the timer 100 is ready (or not) to perform a time measurement for a load transfer operation (e.g., READY, etc.). The display 160 also can display other information related to operational settings or time measurements of the timer 100. For example, the other information can include whether a measured time for a load transfer operation is acceptable (e.g., within normal operating time range) or not acceptable (e.g., outside normal operation time range). An acceptable or unacceptable time measurement reading can be displayed differently, such as using different display characteristics such as different colors, patterns (e.g., flashing/not flashing), and so forth.

In various embodiments, the timer 100 can automatically prepare or get ready (e.g., reset, re-arm, re-initiate, etc.) to perform a new time measurement after completion of each time measurement so a READY status indication on the indicator 166 can inform the user that the timer is ready to perform for a new measurement operation or another measurement operation. In various embodiments, the display 160 can be a display device, such as an LED screen, LCD screen, touchscreen, or other suitable display screen. The display 160 may be configured with different sections, regions or windows for providing different types of information, including those described herein.

The controller(s) 110 can be configured to control the operations of the timer 100 (and components thereof), including those described herein. The controller(s) 110 also can be configured to perform various functions and operations, including those related to a measurement of time for a load transfer operation(s), such as described herein. For example, the controller 110 can be configured to: receive a selection of a transfer mode to be implemented by or through the transfer switch from a plurality of different types of transfer modes; monitor electrical signals from the sensing leads (e.g., 150A, 150B) or signals derived therefrom to sense a supply state of electrical power from first and second power sources to the load; identify an occurrence of a contact lift and an occurrence of a contact landing, which are associated with a load transfer operation of the transfer switch, from the monitored electrical signals or signals derived therefrom; measure (e.g., measure, calculate, determined, derive, etc.) a load transfer time based on a timing of the identified occurrence of the contact lift and the identified occurrence of the contact landing, and the selected transfer mode; and output the measured load transfer time (e.g., output time measurement to the display 160, to a remote device, etc.). A contact lift is an operation of the transfer switch which disconnects one of the first and second powers from the load, and a contact landing is an operation of the transfer switch which connects the other one of the first and second powers to the load.

In various embodiments, the controller(s) 110 can monitor a potential voltage difference between the electrical signals on the sensing leads 150A, 150B to identify an occurrence of a contact lift and an occurrence of a contact landing. The identification order for the contact lift and the contact landing is based on the selected transfer mode, e.g., OT transfer mode or CT transfer mode. For the OT transfer mode, the controller(s) 110 can initially monitor the potential voltage difference for a contact lift, and subsequently monitor the potential voltage difference for a contact landing. For the CT transfer mode, the controller(s) 110 can perform the opposite identification operation than the OT transfer mode. In the CT transfer mode, the controller(s) 110 can initially monitor the potential voltage difference for a contact landing, and subsequently monitor the potential voltage difference for a contact lift.

These and other functions and operations, which can be performed by or under control of the controller(s) 110, are described herein.

Figure 2:
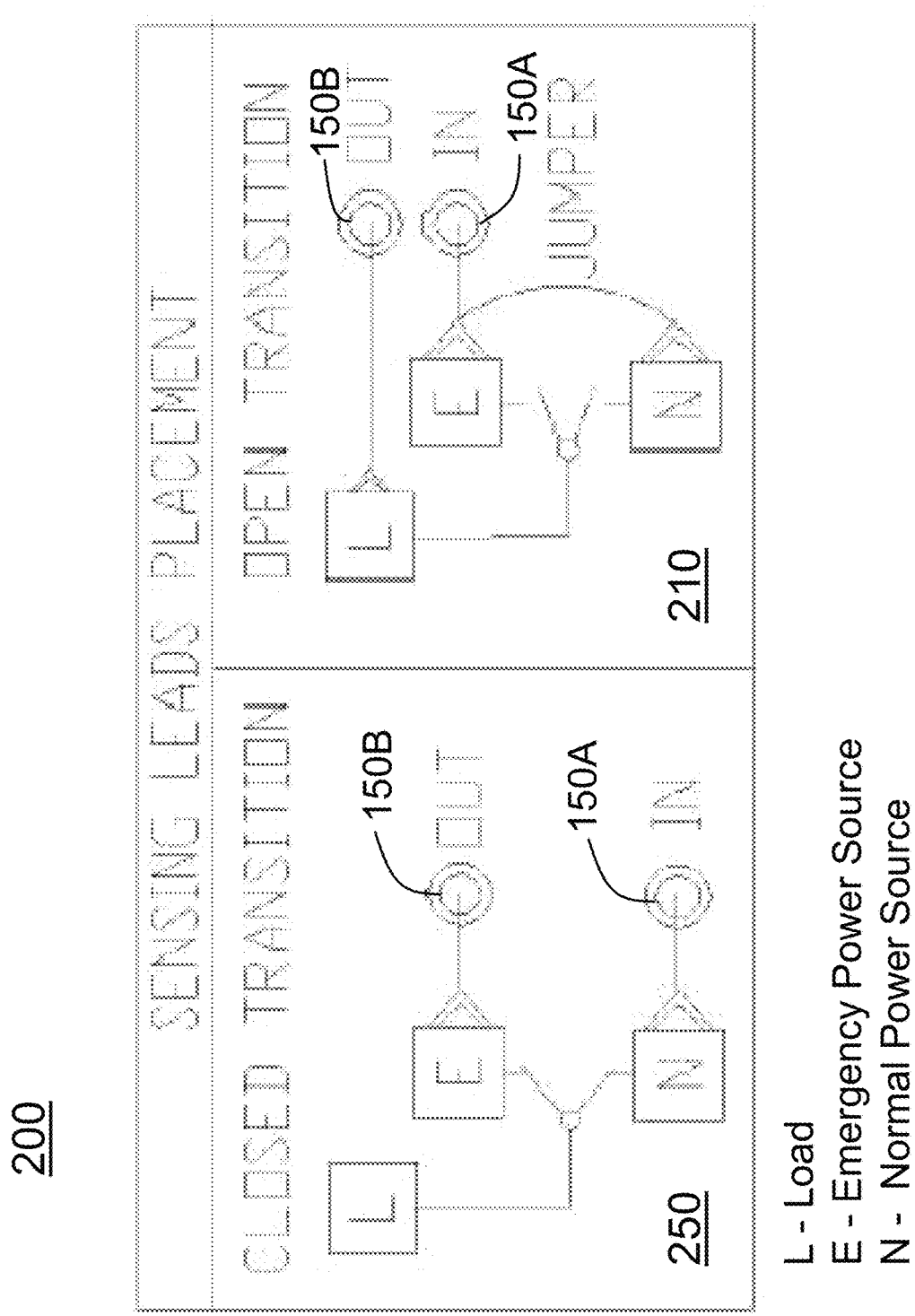
FIG. 2 illustrates example connection configurations to or for the sensing leads of the timer of FIG. 1 according to a type of load transfer mode to be implemented by or through a transfer switch on an electrical system, in accordance with embodiments of the present disclosure.

FIG. 2 illustrates example connection configurations 200 to the sensing leads (or associated connectors) 150A and 150B of the timer 100 of FIG. 1 according to a type of load transfer mode to be implemented by or through a transfer switch on an electrical system, in accordance with embodiments of the present disclosure. As shown in FIG. 2, a connection configuration is shown in 210 for an open transition (OT) transfer mode, and in 250 for a closed transition (CT) transfer mode. For the purposes of explanation, the connection configurations 210, 250 will be described with reference to a transfer operation by or through a transfer switch, which switches a power supply to a load from a first power source such as normal power source (N) to a second power source such as an emergency power source (E).

For the OT transfer mode, the sensing lead 150A for Input is electrically connected or coupled to the emergency power source E to sense a power supply from the emergency power source E, and the sensing lead 150B for Output is electrically connected or coupled to load L to sense a power supply from the normal power source N and the emergency power source E to the load L. A jumper connects the normal energy source N and the emergency power source E on the Input-side. In an example of a timer operation for an OT transfer mode, the normal power source N is initially disconnected from the load L as part of the transfer operation by a contact lift, which can be identified by monitoring the electrical signals from the electrical leads 150A and 150B (or signals derived therefrom). For example, the initial contact lift associated with operation of the transfer switch would result in the electrical signals from the sensing leads 150A and 150B showing an initial state/signal transition from the sensing lead 150A having a High signal (H) and the sensing lead 150B having a High signal (H) to the sensing lead 150A having a High signal (H) and the sensing lead 150B having a Low signal (L). Subsequently, the emergency power source E is connected to the load to complete the transfer operation by a contact landing, which can be identified by monitoring the electrical signals from the electrical leads 150A and 150B (or signals derived therefrom). For example, a contact landing would result in the electrical signals from the sensing leads 150A and 150B showing an initial signal/state transition from the sensing lead 150A having a High signal (H) and the sensing lead 150B having a Low signal (L) to the sensing lead 150A having a High signal (H) and the sensing lead 150B having a High signal (H). In various embodiments, the change in signal/state transition of the electrical signals on the sensing leads 150A and 150B can be evaluated by monitoring a difference, such as a potential voltage difference, between the electrical signals on the pair of sensing leads 150A, 150B. In various embodiments, a potential voltage difference signal can be derived from the electrical signals from the sensing leads 150A and 150B to identify signal/state transition(s). An operational example of an OT transfer mode as shown through such voltage potential (or potential voltage) difference signal, is shown in the open transition hot-to-hot trace example of FIG. 6.

For the CT transfer mode, the sensing lead 150A for Input is electrically connected or coupled to the normal power source N to sense a power supply from the normal power source N to the load L, and the sensing lead 150B for Output is electrically connected or coupled to the emergency power source E to sense a power supply from the emergency power source E to the load L. In an example of a timer operation for a CT transfer mode, one of the two power sources, for example, the normal power source N is initially connected to the load L. When a CT transfer operation is implemented, the other of the two power sources, for example, the emergency power source E is initially connected to the load by a contact landing, which can be identified by monitoring the electrical signals from the electrical leads 150A and 150B (or signals derived therefrom). For example, a contact landing would result in the electrical signals from the sensing leads 150A and 150B showing an initial signal/state transition from the sensing lead 150A having a High signal (H) and the sensing lead 150B having a Low signal (L) to the sensing lead 150A having a High signal (H) and the sensing lead 150B having a High signal (H). Subsequently, the normal power source N is disconnected from the load L to complete the transfer operation by a contact lift, which also can be identified by monitoring the electrical signals from the electrical leads 150A and 150B (or signals derived therefrom). For example, the subsequent contact lift would result in the electrical signals from the sensing leads 150A and 150B showing a subsequent signal/state transition from the sensing lead 150A having a High signal (H) and the sensing lead 150B having a High signal (H) to the sensing lead 150A having a Low signal (L) and the sensing lead 150B having a High signal (H). In various embodiments, the change in signal/state transition of the electrical signals on the sensing leads 150A and 150B can be evaluated by monitoring a difference, such as a potential voltage difference, between the electrical signals on the pair of sensing leads 150A, 150B. In various embodiments, a potential voltage difference signal can be derived from the electrical signals from the sensing leads 150A and 150B to identify signal/state transition(s). An operational example of a CT transfer mode as shown through such voltage potential (or potential voltage) difference signal, is shown in the open transition hot-to-hot trace example of FIG. 7.

It should be understood that the connection configurations in FIG. 2 for the OT and CT transfer modes are simply examples of connection configurations when using a pair of sensing leads in the timer 100. The timer 100 can employ different or other connection configurations with the electrical system (or component(s) thereof) according to the type of transfer modes to monitor in real-time the connection and disconnection of a power source from a plurality of power sources to a load(s) and/or can employ additional sensing leads (e.g., 3 sensing leads, 4 sensing leads, . . . N sensing leads) for connecting to different locations on the electrical system (e.g., at the switch transfer equipment) to monitor in real-time the connection and disconnection of a power source from a plurality of power sources to a load(s).

In various embodiments, there may be noise injected into the electrical signals from the sensing leads 150A and 150B from various sources, including environmental sources, electrical components in the electrical system, and so forth. To generally reduce such noise in the electrical signals and improve measurement accuracy, the timer 100 can incorporate filter(s), such as low-pass filters, to filter out signals having a signal time length below a threshold value (e.g., 40 μ-sec).

In addition to such noise, there also can be noise associated with contact operations of the transfer switch, when connecting or disconnecting a power source to or from a load, such as resulting from or associated with a mechanical contact bouncing from a contact lift operation or a contact landing operation. For example, mechanical contact bouncing from a contact lift operation may have associated therewith contact chatter, and mechanical contact bouncing from a contact landing operation may have associated therewith contact bounce. The contact chatter and bounce from the mechanical contact bouncing may produce false or nuisance signal transitions in the electrical signals from the sensing leads 150A and 150B. Accordingly, to address noise such as contact chatter and bounce, the timer 100 can reduce or eliminate the impact of such noise through software or hardware filtering approaches, in accordance with embodiments. The timer 100 can for example implement filtering techniques, which can ignore such noise when monitoring the electrical signals to identify an occurrence of a contact lift and an occurrence of a contact landing.

For example, when monitoring for a contact lift, the timer 100 can identify a last signal transition (or edge signal) from a sequence of signal transitions monitored via the electrical signals from the sensing leads 150A and 150B (or signals derived therefrom) as the occurrence of the contact lift. In other words, the timer 100 can ignore earlier signal transitions (other than the last one in the sequence of signal transitions), which are likely contact chatter. When monitoring for a contact landing, the timer 100 can identify a first signal transition (or edge signal) from a sequence of signal transitions monitored via the electrical signals from the sensing leads 150A and 150B (or signals derived therefrom) as the occurrence of the contact lift. In other words, the timer 100 can ignore subsequent signal transitions (other than the first one in the sequence of signal transitions), which are likely due to contact bounce.

Figure 3:
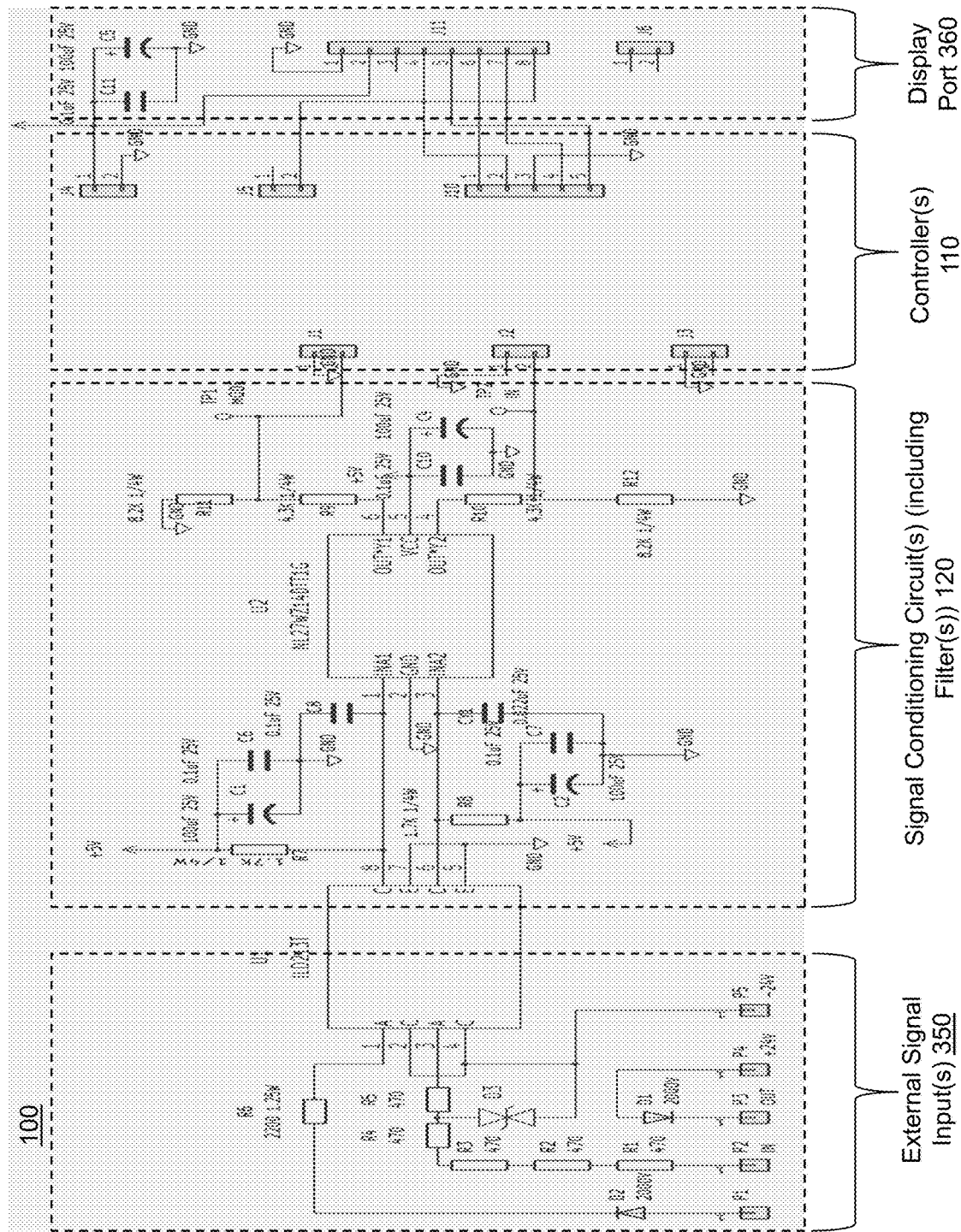
FIG. 3 illustrates example circuit diagram showing exemplary components of the hot-to-hot timer of FIG. 1, in accordance with embodiments of the present disclosure.

FIG. 3 illustrates example circuit diagram showing exemplary components of the hot-to-hot timer 100 of FIG. 1, in accordance with embodiments of the present disclosure. As shown in FIG. 3, the timer 100 can include a controller 110, signal conditioning circuit(s) 120, external signal input(s) 350 and display port 360.

The external signal input(s) 350 can include two external inputs, such as for the mode selector (e.g., 140), the sensing leads (e.g., 150A, 150B), and power supply (e.g., +24V and −24V). For example, the mode selector input is shown as P1, the sensing lead input connections are shown by P2 (IN) and P2 (OUT), and the inputs for the power supply are shown as P4 (+24) and P5 (−24V). For example, P1 can be the mode input (e.g., from 140), which informs the controller 110 which transfer mode to use; P2 can be the signal input used to make the load transfer timing measurement; P3 can be the output signal used for timing measurement after protection circuitry (e.g., 150B); P4 can be the output signal used for timing measurement before protection circuitry (e.g., +24VDC from internal power supply); and P5 can be −24VDC from internal power supply (e.g., 152) and can be made available in order to reduce noise when calibrating/testing equipment.

The signal input(s) 350 is connected to a protection circuit to protect the components of the timer 100 against AC high voltage signal(s), and is provided with galvanic isolation. In this example, the voltage supplied to the controller 100 from the power supply is adjusted or lowered, via voltage converter circuit(s), to a compatible voltage level (e.g., 5V) for powering the controller 100 and other components of the timer 100.

The signal conditioning circuit 120 performs signal conditioning of the electrical signals received from the sensing leads for subsequent processing by the controller. The signal conditioning circuit 120 can include a low-pass filter to filter out signals from the sensing leads which are below a predefined signal time length. The signal conditioning circuit 120 also can include a circuit(s) to convert the electrical signals from the sensing leads to signal pulses (or pulse signals), from which a connection or disconnection of a power source from a plurality of power sources to or from a load can be identified in real-time. For example, the circuit(s) can include a Schmitt trigger or other pulse generating circuit to convert a regular or irregular shaped input waveform into a square wave output voltage or pulse The controller 110 can be configured to translate the pulse(s) representative of electrical signals from the sensing leads into human readable timing measurement, based on the selected type of transfer mode (e.g., OT transfer mode, CT transfer mode, etc.). For example, the controller 110 can be configured to implement a calculation mode for a timing measurement based on the selected type of transfer mode. In various embodiments, the controller 110 may perform software filtering of inputted signals to reduce or eliminate noise (or other unwanted signals), including noise from contact chatter and/or contact bounce. The controller 110 can calculate and output the timing measurement for a load transfer operation as well as other information (e.g., mode selection, status indication for the timer 100 such as READY, etc.) to a display (e.g., 160) via the display port 360. The display port 360 can use serial peripheral interface (SPI) and Inter-Integrated Circuit (IIC or I2C) for wide display compatibility.

In various embodiments, the controller 110 can automatically prepare the timer 100 to perform a new timing measurement for another load transfer operation on an electrical system to be monitored after a predefined time period from the completion of a prior time measurement operation.

The circuit components and configuration for the timer 100 in FIG. 3 is provided as an example. Other circuit components and configurations may be employed for the timer 100 to perform the various functions and operations for the timer 100, as described herein.

Figure 4:
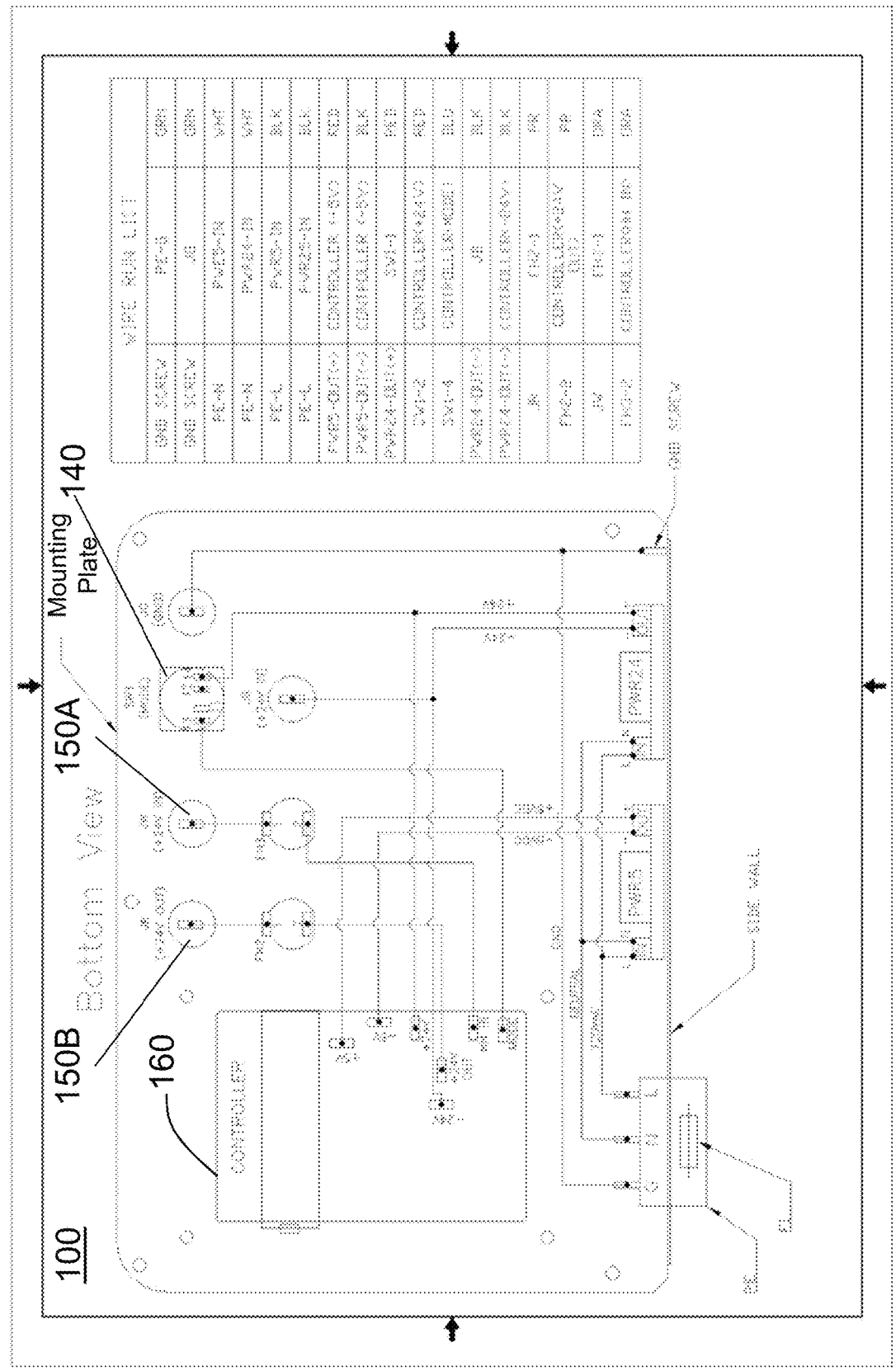
FIG. 4 illustrates an example wiring diagram for the hot-to-hot timer of FIG. 1, in accordance with embodiments of the present disclosure.

FIG. 4 illustrates an example wiring diagram for the hot-to-hot timer 100 of FIG. 1, in accordance with embodiments of the present disclosure. As shown in FIG. 4, the timer 100 can include Input sensing lead 150A (e.g., JW) and Output sensing lead 150B (e.g., JR), a mode selector 150 (e.g., SW1), which are connected or coupled to the controller 160 via wiring. The timer 100 also can include a power supply (e.g., 24V), which can be converted to a lower voltage (e.g., 5V) for powering components of the timer 100, including the controller 160. Other example wiring connections for the timer 100 are shown on wiring diagram and the wire run list of FIG. 4. The wiring connection and configuration for the timer 100 in FIG. 4 is provided as an example. Other wiring connection and configurations may be employed for the timer 100 to perform the various functions and operations for the timer 100, as described herein.

Figure 5:
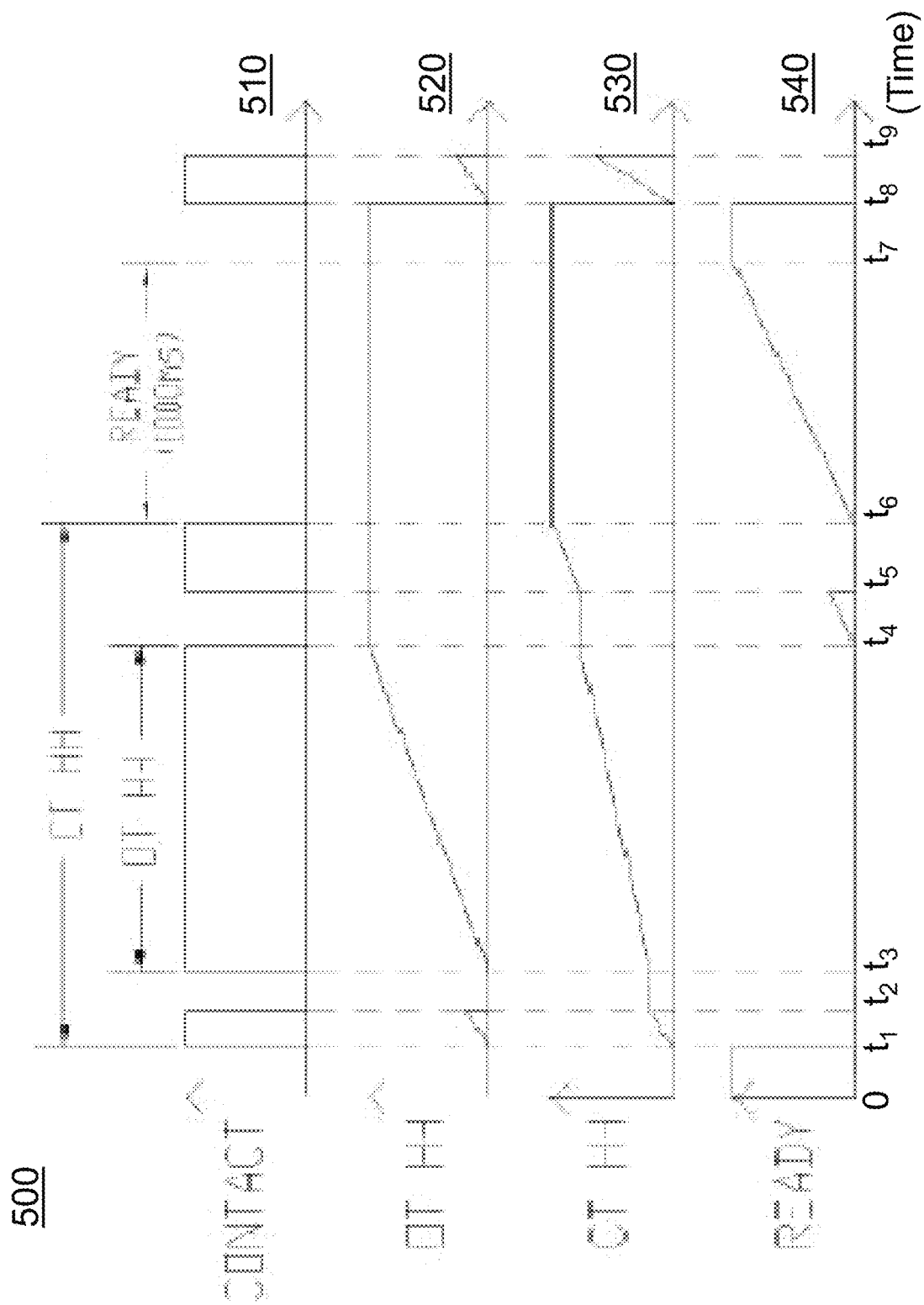
FIG. 5 illustrates graphs showing example timing diagrams for contact, open transition, closed transition and timer Ready status for a load transfer measurement scenario by a hot-to-hot timer, in accordance with embodiments of the present disclosure.

FIG. 5 illustrates an example timing diagram 500 related to an exemplary load transfer operation over time. The timing diagram 500 shows example timing graphs 510, 520, 530 and 540 for Contact, Open Transition (OT) transfer mode, Closed Transition (CT) transfer mode, and Ready status, respectively, for a load transfer measurement scenario by a hot-to-hot timer, in accordance with embodiments of the present disclosure. Two different types of transfer modes, e.g., OT and CT, are shown at the same time in the timing diagram 500.

As shown at time=0, the timer is ready to perform a time measurement for a load transfer operation. The scenarios for two different transfer modes, e.g., OT and CT, are shown in the graphs 520 and 530, respectively.

For the OT transfer mode as shown in the graph 520, the timer detects a contact lift at time t3 and a contact landing at t4, and calculates the time measurement for an OT load transfer, e.g., t5 minus t3. In various embodiments, initial contact chatter (e.g., t1) and post landing contact bouncing (e.g., t5) are ignored. At t7 after a time period (e.g., 1000 milli-sec), the timer is ready to perform a new time measurement operation for another load transfer operation.

For the CT transfer mode as shown in the graph 530, the timer detects a contact landing at time t1 and a contact lift at t6, and calculates the time measurement for an CT load transfer, e.g., t6 minus t1. In various embodiments, landing contact bouncing (e.g., t2) and contact chatter (e.g., t4) are ignored. At t7 after a time period (e.g., 1000 milliseconds or 1 second), the timer is ready to perform a new time measurement operation for another load transfer operation.

Figure 6:
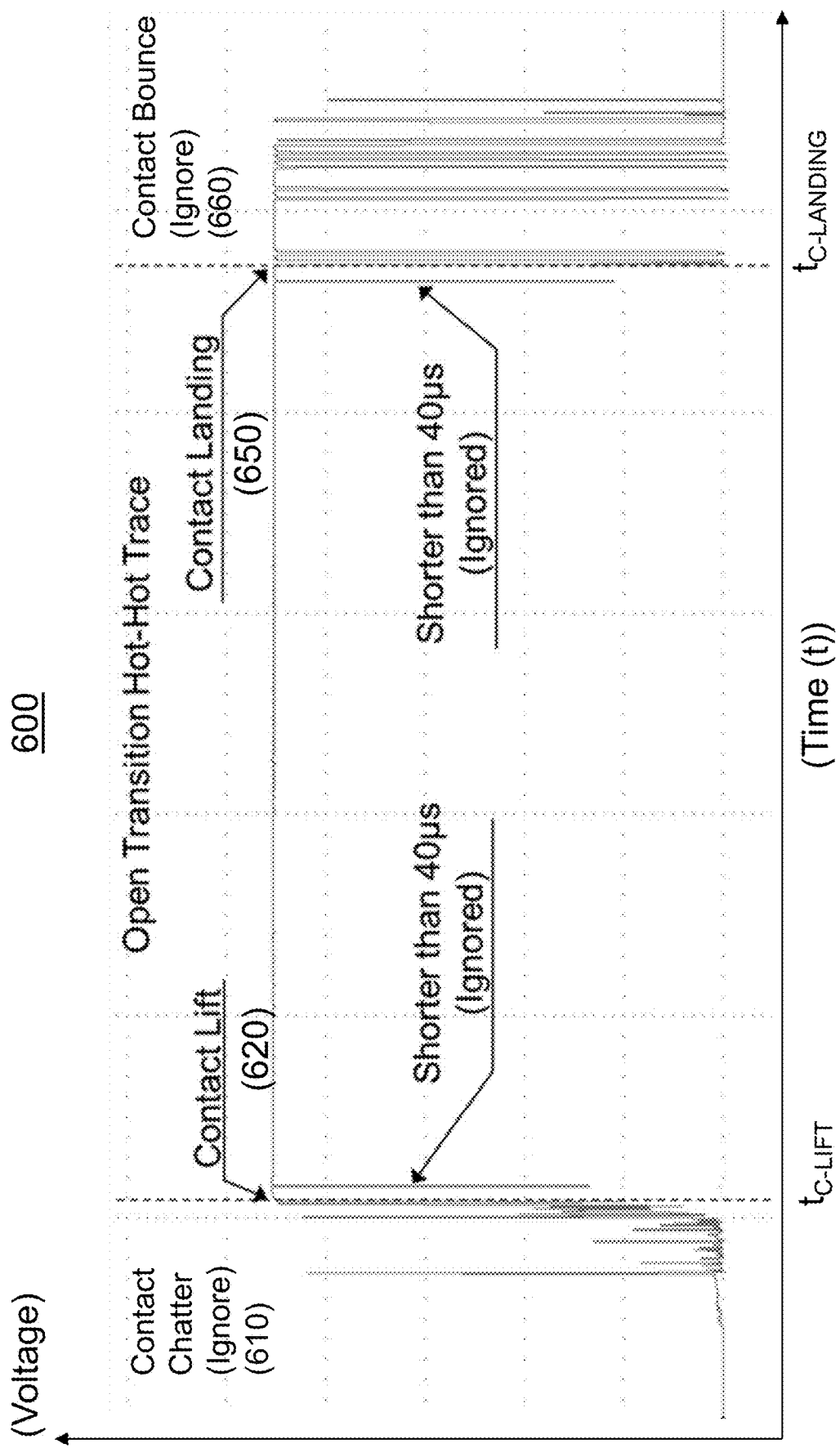
FIG. 6 illustrates a graph of an example open transition hot-to-hot trace in which a load transfer time measurement is a time from a contact lift to a contact landing, in accordance with embodiments of the present disclosure.

FIG. 6 illustrates a graph 600 of an example open transition (OT) hot-to-hot trace in which a load transfer time measurement is a time from a contact lift to a contact landing, in accordance with embodiments of the present disclosure. In this example, the trace signals as shown can reflect a potential voltage difference between the electrical signals on the input sensing lead (e.g., 150A) and the output sensing lead (e.g., 150B) over time for the OT connection configuration shown in FIG. 2, and can be derived from the electrical signals on the input sensing leads. In this example, the trace signals can represent a potential voltage difference between the electrical signals on the pair of sensing leads (e.g., 150A and 150B). A signal transition (or edge) of the trace signals can reflect a contact lift (e.g., Low-to High signal transition) or a contact landing (e.g., High-to-Low signal transition).

In this example OT scenario, a first power source is initially connected to the load. When an OT transfer operation is initiated, a contact lift operation is initially performed by or through a transfer switch on the electrical system to disconnect the first power source from the load. The contact lift operation, however, may result in contact chatter 610 resulting from mechanical contact bouncing as the contact is lifted to disconnect the first power source from the load. To provide for an accurate time measurement of the load transfer operation, the timer can disregard or ignore the contact chatter 610, or more particularly, the monitored electrical signals (or signals derived therefrom) associated with the contact chatter when identifying the occurrence of a contact lift in relation to time. For example, the timer can be configured to identify, as the contact lift 620, the last signal transition (e.g., the last Low-to-High signal transition) in a sequence of signal transitions reflected from the monitored electrical signals from the sensing leads or signals derived therefrom, thereby ignoring the contact chatter 610.

Subsequently, a contact landing operation is performed by or through the transfer switch on the electrical system to connect a second power source to the load. The contact landing operation, however, may result in a significant amount of contact bounce 660 (e.g., too many contact bouncing) resulting from mechanical contact bouncing as the contact lands to connect the second power source to the load. To provide for an accurate time measurement of the load transfer operation, the timer can disregard or ignore the contact bounce 660, or more particularly, the monitored electrical signals (or signals derived therefrom) associated with the contact bounce 660 when identifying the occurrence of a contact landing in relation to time. For example, the timer can be configured to identify, as the contact landing 650, the first signal transition (e.g., the first High-to-Low signal transition) in a sequence of signal transitions reflected from the monitored electrical signals from the sensing leads or signals derived therefrom, thereby ignoring the contact bounce 660.

In various embodiments, the timer also can employ additional filtering techniques, in hardware and software, to filter out or ignore noise, such as signals below a predefined signal time length (e.g., 40 μ-sec) from the monitored electrical signals from the sensing leads or signals derived from the monitored electrical signals. For example, in some embodiments, the timer can employ filtering techniques, such as a low-pass filter(s) or filter circuit(s).

Once the timer identifies an initial occurrence of a contact lift and a subsequent occurrence of a contact landing, the timer can calculate the time measurement for the OT transfer operation, e.g., the time difference between the time of the contact lift ($t_{C\text{-}LIFT}$) and the time of the contact landing ($t_{C\text{-}LANDING}$). The timer can thereafter output the time measurement and perform other action(s) according to the measured transfer time.

Figure 7:
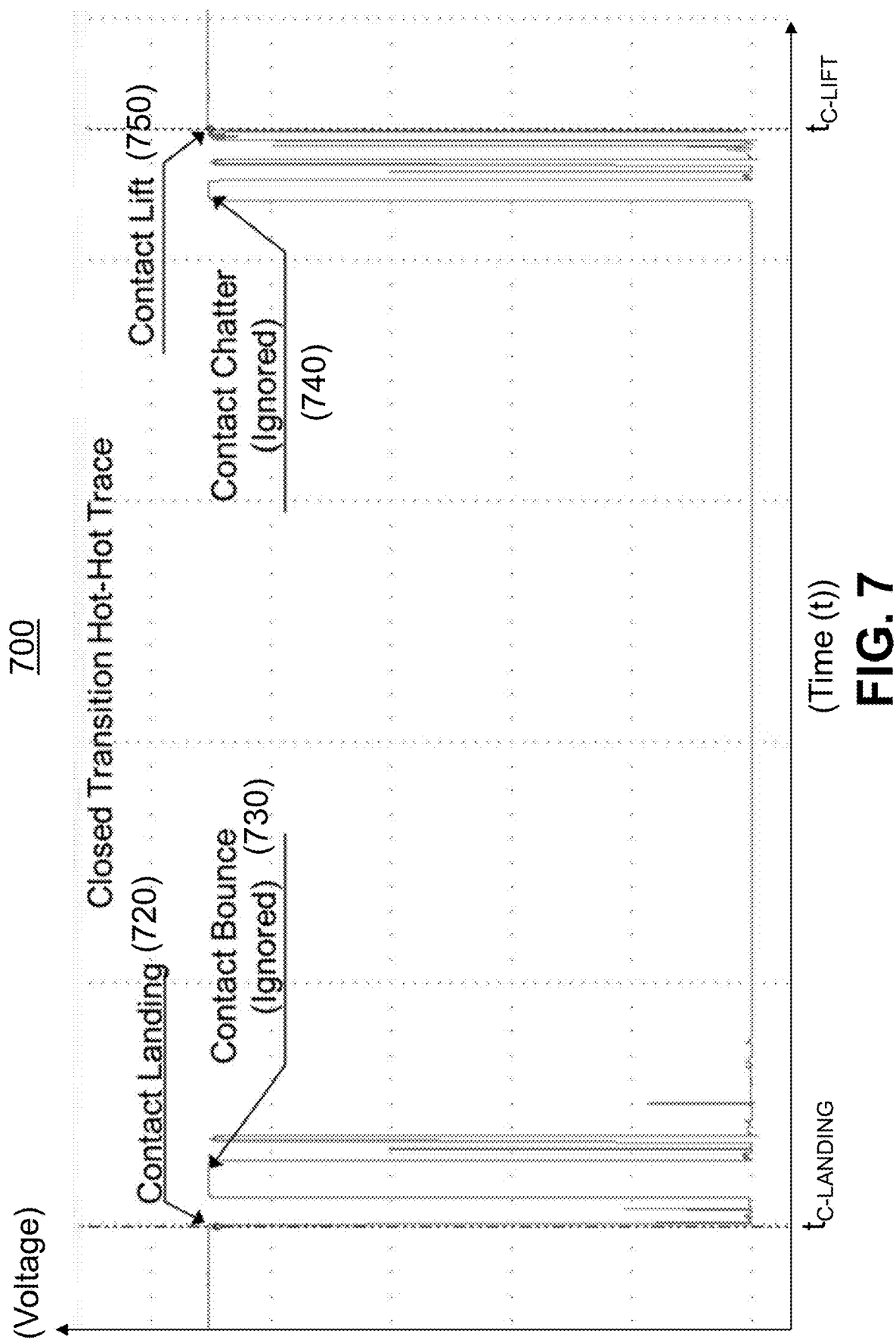
FIG. 7 illustrates a graph of an example closed transition hot-to-hot trace in which a load transfer time measurement is a time from a contact landing to a contact lift, in accordance with embodiments of the present disclosure.

FIG. 7 illustrates a graph 700 of an example closed transition (CT) hot-to-hot trace in which a load transfer time measurement is a time from a contact landing to a contact lift, in accordance with embodiments of the present disclosure. In this example, the trace signals as shown can reflect a potential voltage difference between the electrical signals on the input sensing lead (e.g., 150A) and the output sensing lead (e.g., 150B) over time for the CT connection configuration shown in FIG. 2, and can be derived from the electrical signals on the input sensing leads. In this example, the trace signals can represent a potential voltage difference between the electrical signals on the pair of sensing leads (e.g., 150A and 150B). A signal transition (or edge) of the trace signals can reflect a contact lift (e.g., Low-to High signal transition) or a contact landing (e.g., High-to-Low signal transition).

In this example CT scenario, a first power source is initially connected to the load. When a CT transfer operation is initiated, a contact landing operation is performed by or through the transfer switch on the electrical system to connect a second power source to the load. The contact landing operation, however, may result in contact bounce 730 resulting from mechanical contact bouncing as the contact lands to connect the second power source to the load. To provide for an accurate time measurement of the load transfer operation, the timer can disregard or ignore the contact bounce 730, or more particularly, the monitored electrical signals (or signals derived therefrom) associated with the contact bounce when identifying the occurrence of a contact landing in relation to time. For example, the timer can be configured to identify, as the contact landing 720, the first signal transition (e.g., the first High-to-Low signal transition) in a sequence of signal transitions reflected from the monitored electrical signals from the sensing leads or signals derived therefrom, thereby ignoring the contact bounce 730.

Subsequently, a contact lift operation is performed by or through a transfer switch on the electrical system to disconnect the first power source from the load. The contact lift operation, however, may result in contact chatter 740 resulting from mechanical contact bouncing as the contact is lifted to disconnect the first power source from the load. To provide for an accurate time measurement of the load transfer operation, the timer can disregard or ignore the contact chatter 740, or more particularly, the monitored electrical signals (or signals derived therefrom) associated with the contact chatter when identifying the occurrence of a contact lift in relation to time. For example, the timer can be configured to identify, as the contact lift 750, the last signal transition (e.g., the last Low-to-High signal transition) in a sequence of signal transitions reflected from the monitored electrical signals from the sensing leads or signals derived therefrom, thereby ignoring the contact chatter 740.

In various embodiments, the timer also can employ additional filtering techniques, in hardware and software, to filter out or ignore noise, such as signals below a predefined signal time length (e.g., 40 μ-sec) from the monitored electrical signals from the sensing leads or signals derived from the monitored electrical signals. For example, in some embodiments, the timer can employ filtering techniques, such as a low-pass filter(s) or filter circuit(s).

Once the timer identifies an initial occurrence of a contact landing and a subsequent occurrence of a contact lift, the timer can calculate the time measurement for the CT transfer operation, e.g., the time difference between the time of the contact landing ($t_{C\text{-}LANDING}$) and the time of the contact lift ($t_{C\text{-}LIFT}$). The timer can thereafter output the time measurement and perform other action(s) according to the measured transfer time.

Figure 8:
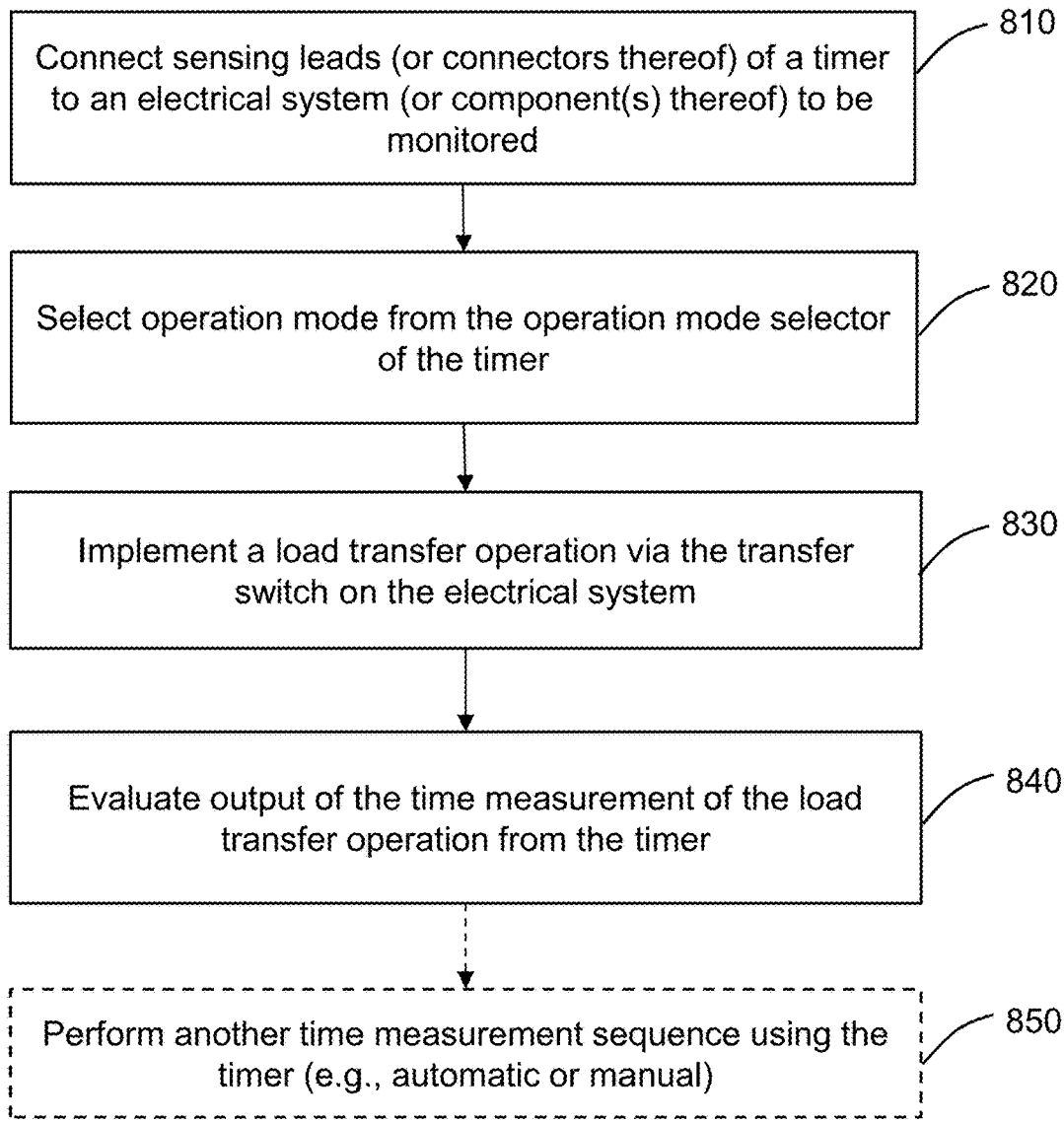
FIG. 8 illustrates a flow chart of an example process for operating a timer to implement a load transfer time measurement(s), in accordance with embodiments of the present disclosure.

FIG. 8 illustrates a flow chart of an example process 800 for operating a timer to implement a load transfer time measurement(s), in accordance with embodiments of the present disclosure. By way of example, the process 800 will be described with reference to a timer and its components (e.g., timer 100) and an electrical system with a plurality of power sources from which to supply electrical power to a load and a transfer switch by or through which to implement a load transfer operation from one of the power sources (e.g., a first power source) to another one of the power sources (e.g., a second power source).

The process 800 begins at block 810 with the connection of the sensing leads (or connectors thereof) of the timer to the electrical system (or component(s) thereof) to be monitored. The sensing leads may be connected to the electrical system at suitable locations to enable monitoring a supply state of electrical power from a plurality of power sources, e.g., the first and second power sources, to the load. In this way, changes in the supply state of power from each of the power sources to the load can be monitored to identify the connection or disconnection of a power source to the load, and thus, a load transfer operation from one power source to another power source from the plurality of power sources. In various embodiments, the sensing leads (or connectors) can be connected to the electrical system at the electrical panel of the transfer switch or in other locations of the electrical system, which may provide for suitable connection points. For example, the sensing leads (or connectors) can be connected in the following locations of the electrical system: lugs, sensing leads from the equipment of the electrical system; electrical bus, or other terminals connected to the Normal, Emergency and Load bus(es).

At block 820, an operation mode is selected on the timer from a plurality of operation modes. The operation modes can include an open transition (OT) transfer mode and a closed transition (CT) transfer mode. A user may select the operation mode through a mode selector on the timer, via a user input device on the timer or through a remote device (e.g., a user device, smartphone, computer tablet, computer, computer-implemented central management system, etc.) communicatively coupled to the timer.

At block 830, a load transfer operation can be implemented by or through the transfer switch on the electrical system. For example, a user can manually initiate a test of a load transfer operation by or through the transfer switch. The timer can measure a timing of the load transfer operation by evaluating the electrical signals monitored through the sensing leads. As described herein, the timer can be configured to filter out (e.g., eliminate or ignore) various types of noise on the monitored electrical signals from the sensing leads or signals derived therefrom. Such noise can include among other things environmental noise and noise resulting from mechanical contact bouncing (e.g., contact chatter, contact bounce, etc.).

At block 840, the output of the time measurement of the load transfer operation from the timer can be evaluated by a user. For example, the time measurement can be output to an output device on the timer (e.g., a display, etc.) or to the remote device which also can have an output device (e.g., a display, etc.) to indicate the time measurement. The user can evaluate the time measurement on the timer or remote device.

At block 850, another time measurement sequence (e.g., 820, 830 and 840) using the timer can be performed. In various embodiments, the timer can be configured to prepare, automatically or manually, for a new time measurement after each completed time measurement. For example, the timer can automatically prepare to implement a new time measurement after a predetermined time period has elapsed from a prior time measurement.

In various embodiments, the process 800 can also employ an oscilloscope or other time measurement equipment, which can be implemented in parallel with the timer, to check the accuracy or performance of the timer.

Figure 9:
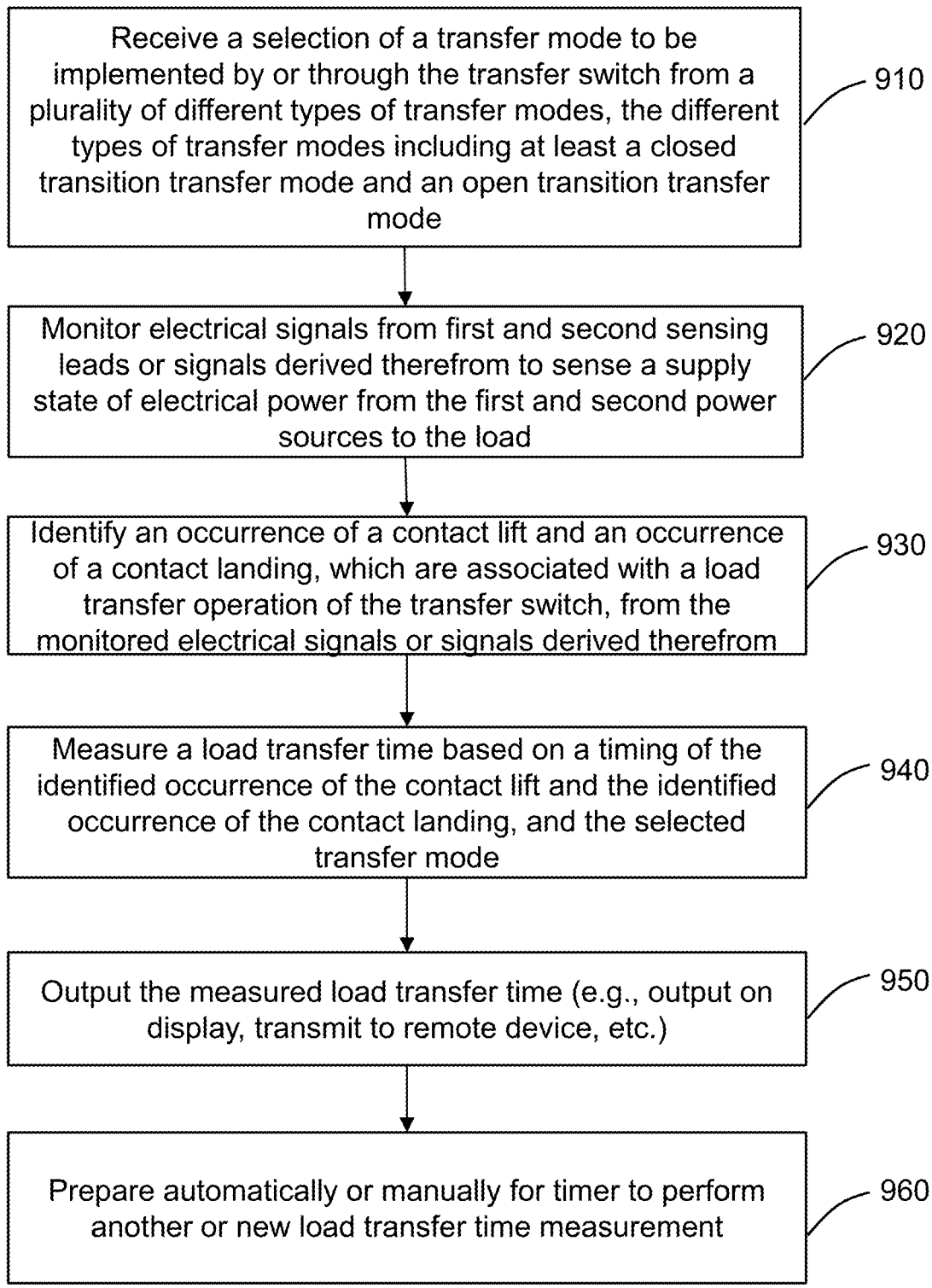
FIG. 9 illustrates a flow chart of an example process by which a hot-to-hot timer (or component(s) thereof) implements a load transfer time measurement(s), in accordance with embodiments of the present disclosure.

FIG. 9 illustrates a flow chart of an example process 900 by which a hot-to-hot timer (or component(s) thereof) implements a load transfer time measurement(s), in accordance with embodiments of the present disclosure. By way of example, the process 900 will be described with reference to a timer and its components (e.g., timer 100) and an electrical system with a plurality of power sources from which to supply electrical power to a load and a transfer switch by or through which to implement a load transfer operation from one of the power sources (e.g., a first power source) to another one of the power sources (e.g., a second power source). The operations of the process 900 can be implemented by or under control of a controller(s) (e.g., 110) of the timer.

The process 900 begins at block 910 in which a controller receives a selection of a transfer mode to be implemented by or through the transfer switch from a plurality of different types of transfer modes. The different types of transfer modes can include at least a closed transition (CT) transfer mode and an open transition (OT) transfer mode. The controller can receive the selection of the transfer mode from a mode selector on the timer. An indication of the selected mode (e.g., CT or OT) can be output on an output device (e.g., display) of the timer. The controller can set the timer to operate according to the selected transfer mode.

At block 920, the controller monitors electrical signals from first and second sensing leads or signals derived therefrom to sense a supply state of electrical power from the first and second power sources to the load. Each of the first and second sensing leads is connectable or couplable to the electrical system or a component thereof according to the transfer mode being implemented by or through the transfer switch. Examples of connection configuration are shown in the example of FIG. 2.

At block 930, the controller identifies an occurrence of a contact lift and an occurrence of a contact landing, which are associated with a load transfer operation of the transfer switch, from the monitored electrical signals or signals derived therefrom. The contact lift is an operation of the transfer switch which disconnects one of the first and second powers from the load. The contact landing is an operation of the transfer switch which connects the other one of the first and second powers to the load.

As described herein, the timer can be configured to filter out (e.g., eliminate or ignore) various types of noise on the monitored electrical signals from the sensing leads or signals derived therefrom, in hardware or software. Such noise can include among other things environmental noise and noise resulting from mechanical contact bouncing (e.g., contact chatter, contact bounce, etc.) associated with transfer switch equipment during a transfer load operation. In various embodiments, the controller can be configured to filter out such noise from the monitored electrical signals (or signals derived therefrom), e.g., ignore noise such as contact chatter and contact bounce when identifying an occurrence of contact landing and an occurrence of contact lift, associated with a load transfer operation.

In various embodiments, the operational order in which an occurrence of the contact lift and an occurrence of the contact landing are to be identified by the timer can be based on the selected transfer mode.

At block 940, the controller measures a load transfer time based on a timing of the identified occurrence of the contact lift and the identified occurrence of the contact landing, and the selected transfer mode.

At block 950, the controller outputs the measured load transfer time. The controller can output the time measurement of the load transfer operation to an output device (e.g., a display) or to a remote device (e.g., a user device, smartphone, computer tablet, computer, computer-implemented central management system, etc.).

At block 960, the controller can prepare, automatically or manually, for the timer to perform another or new load transfer time measurement for the electrical system. For example, the controller can automatically prepare the timer to implement a new time measurement after a predetermined time period has elapsed from a prior time measurement or completion/output thereof. An indication of the readiness (e.g., READY) of the timer to perform a time measurement can be output on an output device (e.g., display) of the timer.

The process 900 is provided as an example implementation of various operations, which may be performed by or under control of one or more controllers of a timer. The timer or associated controller(s) can be configured to perform additional or modified operations. For example, the controller can be configured to further evaluate the time measurement, and take one or more actions (or have one or more actions taken) based on the evaluation. In an embodiment, the controller can evaluate the time measurement versus a time threshold(s) to ascertain whether the measurement is within an acceptable (e.g., normal time range for load transfer operation) or unacceptable time range (e.g., abnormal time range for load transfer operation). Furthermore, the controller can take various actions based on the evaluation of one or more time measurements, such as for example output a report on the status of the time measurement (e.g., NORMAL or ABNORMAL) via the output device on the timer or to a remote device, can output an alarm via the output device on the timer or to a remote device when the time measurement is unacceptable, can recommend the performance of another time measurement when the time measurement is unacceptable, and so forth.

In various embodiments, the controller can be configured to store information, such as the time measurements in relation to time, and if desired, as well as date, test session, electrical system/transfer switch tested, test location, and/or other data relevant to the test measurement. The stored information can be accessed through the timer for output on an output device or further evaluated on the timer, or supplied to a remote device for output or further processing and evaluation.

Figure 10:
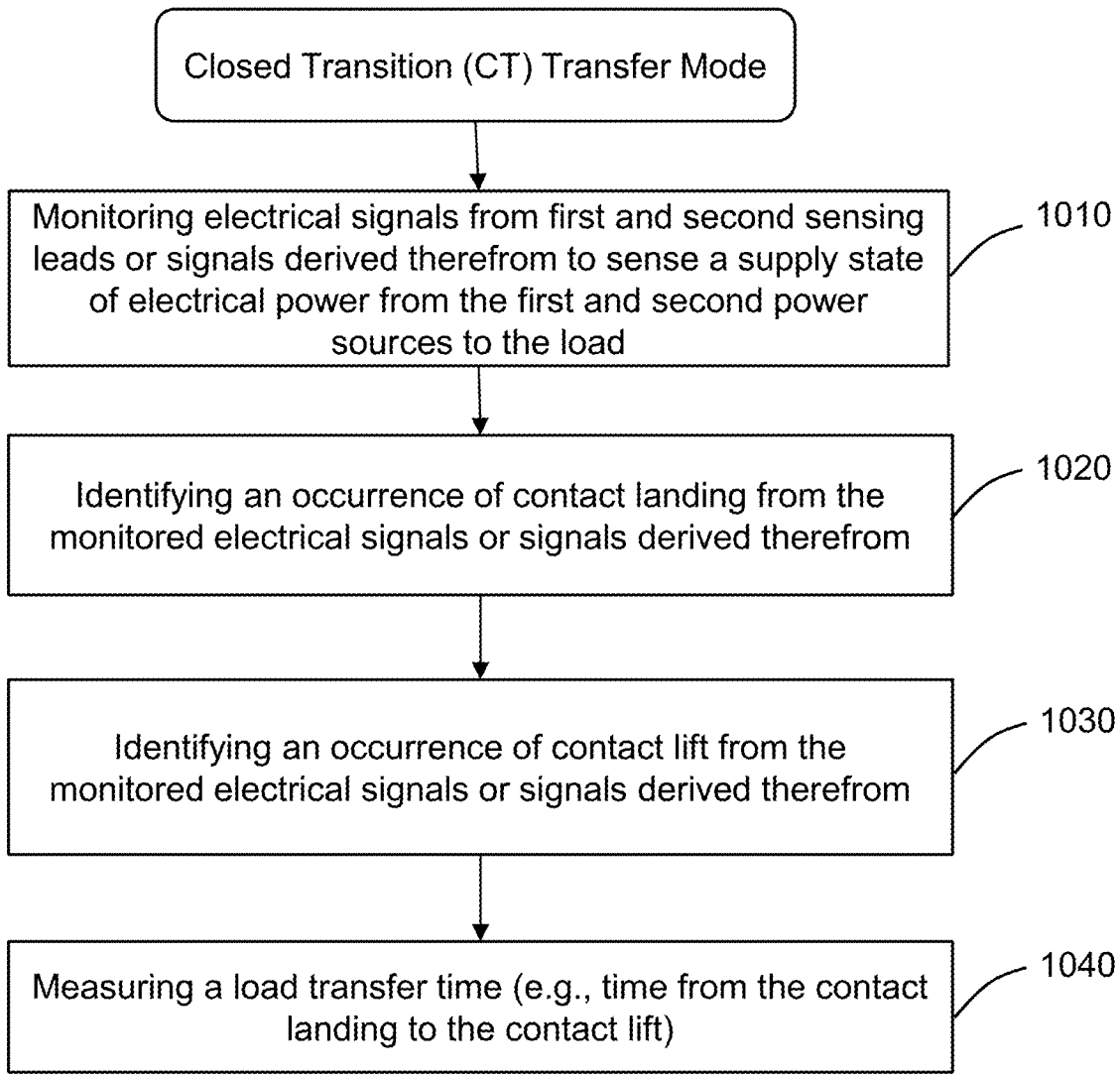
FIG. 10 illustrates a flow chart of an example process by which a hot-to-hot timer (or component(s) thereof) implements a load transfer time measurement(s) for a closed transition transfer mode, in accordance with embodiments of the present disclosure.

FIG. 10 illustrates a flow chart of an example process 1000 by which a hot-to-hot timer (or component(s) thereof) implements a load transfer time measurement(s) for a closed transition (CT) transfer mode, in accordance with embodiments of the present disclosure. By way of example, the process 1000 will be described with reference to a timer and its components (e.g., timer 100) and an electrical system with a plurality of power sources from which to supply electrical power to a load and a transfer switch by or through which to implement a load transfer operation from one of the power sources (e.g., a first power source) to another one of the power sources (e.g., a second power source). The operations of the process 1000 can be implemented by or under control of a controller(s) (e.g., 110) of the timer, and can be an example of a subprocess of the process 900 in FIG. 9.

The process 1000 begins at block 1010 in which a controller monitors electrical signals from first and second sensing leads or signals derived therefrom to sense a supply state of electrical power from the first and second power sources to the load. Each of the first and second sensing leads is connectable or couplable to the electrical system or a component thereof according to the CT transfer mode being implemented by or through the transfer switch. An example of CT connection configuration is shown in the example of FIG. 2.

At block 1020, the controller identifies an occurrence of a contact landing from the monitored electrical signals or signals derived therefrom.

At block 1030, the controller identifies a subsequent occurrence of a contact lift from the monitored electrical signals or signals derived therefrom At block 1040, the controller measures a load transfer time, e.g., a time from the contact landing to the contact lift.

Figure 11:
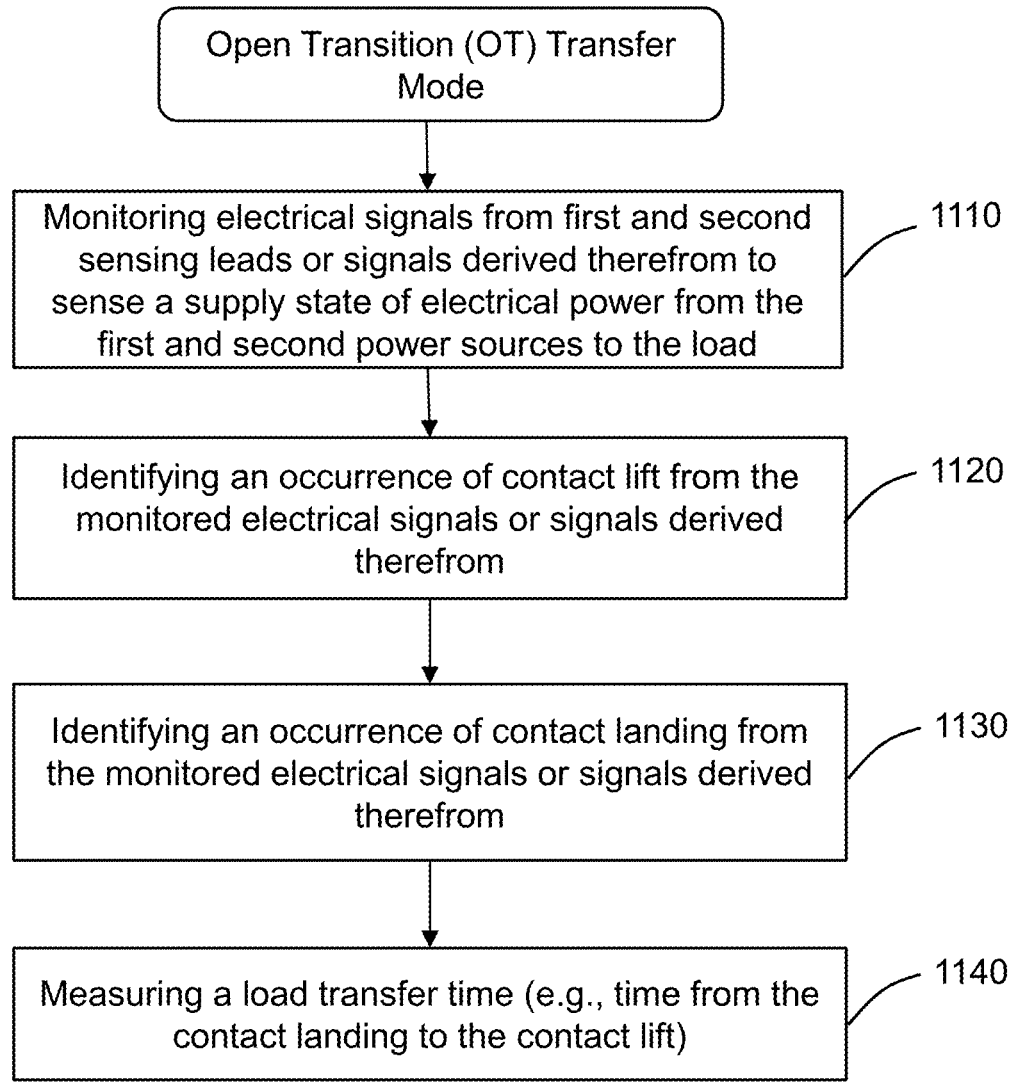
FIG. 11 illustrates a flow chart of an example process by which a hot-to-hot timer (or component(s) thereof) implements a load transfer time measurement(s) for an open transition transfer mode, in accordance with embodiments of the present disclosure.

FIG. 11 illustrates a flow chart of an example process by which a hot-to-hot timer (or component(s) thereof) implements a load transfer time measurement(s) for an open transition (OT) transfer mode, in accordance with embodiments of the present disclosure. By way of example, the process 1100 will be described with reference to a timer and its components (e.g., timer 100) and an electrical system with a plurality of power sources from which to supply electrical power to a load and a transfer switch by or through which to implement a load transfer operation from one of the power sources (e.g., a first power source) to another one of the power sources (e.g., a second power source). The operations of the process 1100 can be implemented by or under control of a controller(s) (e.g., 110) of the timer, and can be an example of a subprocess of the process 900 in FIG. 9.

The process 1100 begins at block 1110 in which a controller monitors electrical signals from first and second sensing leads or signals derived therefrom to sense a supply state of electrical power from the first and second power sources to the load. Each of the first and second sensing leads is connectable or couplable to the electrical system or a component thereof according to the OT transfer mode being implemented by or through the transfer switch. An example of OT connection configuration is shown in the example of FIG. 2.

At block 1120, the controller identifies an occurrence of a contact lift from the monitored electrical signals or signals derived therefrom.

At block 1130, the controller identifies a subsequent occurrence of a contact landing from the monitored electrical signals or signals derived therefrom At block 1140, the controller measures a load transfer time, e.g., a time from the contact lift to the contact landing.

Figure 12:
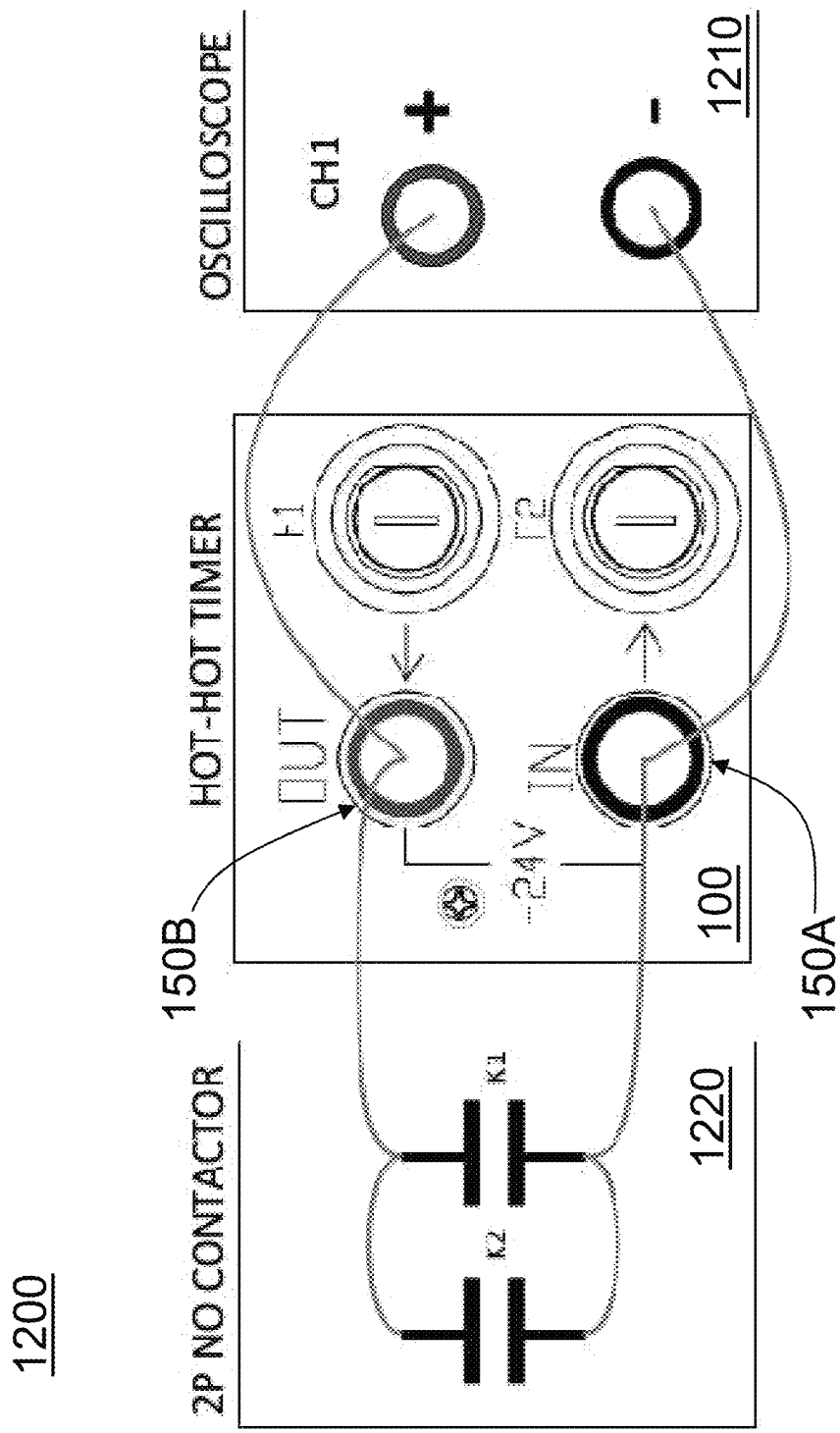
FIG. 12 illustrates a block diagram of a system for monitoring or measuring a performance or accuracy of load transfer time measurement(s) by a hot-to-hot timer using an oscilloscope, in accordance with embodiments of the present disclosure.

FIG. 12 illustrates a block diagram of a system 1200 for monitoring or measuring a performance or accuracy of time measurement(s) performed by a hot-to-hot timer (e.g., 100) of load transfer operation on an electrical system 1220, in accordance with embodiments of the present disclosure. The system 1200 can include an oscilloscope 1210, which is used in parallel to check the performance or accuracy of the time measurement(s) performed by the timer 100. The oscilloscope 1210 can have a 100 Khz bandwidth minimum. The electrical system 1220 can include power sources and a transfer switch such as one pole (1P) contactor or two poles (2P) contactor (e.g., 2-pole (2) normally open (NO) contactor). It is noted that the wiring diagram in FIG. 12 is basically the same for both a normally open (NO) contactor and normally closed (NC) contactor.

To monitor the electrical activity on the electrical system 1220, such as the supply state of power being supplied from each of the power sources to a load (including changes thereof), the timer 100 and the oscilloscope 1210 can be coupled or connected to the electrical system 1220 across test leads. The test leads can be a pair of test leads wires or one 1×, 1 MHz or higher bandwidth scope probe. As shown in the example of FIG. 12, a pair of test leads is connected to the electrical system 1220, with power sources K1 and K2 and a mechanical contactor (e.g., a 2P NO contactor). The pair of test leads also are connected to sensing lead connections/connectors 150A (IN) and 150B (OUT) of the timer 100, and connectors for a channel (e.g., CH1) of the oscilloscope 1210. In various embodiments, timing fixture can provide its own low voltage signal through output 150B.

In general, the electrical signals from the test leads connected or coupled to the electrical system 1220 can be monitored by both the timer 100 and the oscilloscope 1210 for measuring a time/timing of a load transfer operation on the electrical system 1220. The time measurement value(s) for a load transfer operation(s) from the timer 100 can be compared against time measurement value(s) determined through the use of the oscilloscope 1210 to verify the accuracy of the timer, such as timer 100. A timer can be periodically tested to ensure that the timer is operating within normal operating parameters.

An example accuracy testing operation of the system 1200 and its devices in FIG. 12 will be described. For example, before performing time measurement(s) for a load transfer operation(s), initial setup operations are performed on the timer 100. On the timer 100, the sensing lead connections/connectors 150A, 150B (e.g., IN/OUT) are placed in parallel with the mechanical contactor over a pair of test leads, and closed transition (CT) is selected for a NO contactor or open transition (OT) is selected for a NC contactor. On the oscilloscope 1210, the channel input is placed in parallel with the OUT/IN input of the timer 100, the channel amplitude is set for 24V (usually 5V/DIV), the scope BANDWIDTH or ACQUISITION rate is set to at least 100 KHz, the TRIGGER level is set to +20V and the oscilloscope 1220 is armed.

Thereafter, the contactor of the electrical system 1220 can be operated to perform a load transfer operation. The timer 100 can measure and output a time/timing of the load transfer operation. The signal on the screen of the oscilloscope 1210 can be checked. The TIMEBASE can be adjusted so both contact landing and lift can be seen on the screen of the oscilloscope 1210, and the previous step can be repeated as much as needed. The measurement signal time can be kept to less than 50 ms to make dealing with contact chatter and bouncing much easier.

To properly verify the accuracy of a time measurement(s) of the load transfer operation by the timer 100, it is important to use the same measurement methodology, as implemented on the timer 100, when using the oscilloscope 1210 to perform time measurement(s). By way of example methodology, the timer 100 can take contact chatter and bouncing into account when measuring a time/timing for Hot-to-Hot transfer operation. For example, as to contact bouncing, during contact closing, the first signal change indicates contact landing while the following signals are caused by contact bouncing. Therefore, the timer can use the first signal change when dealing with contact bouncing, while ignoring the following bouncing pulses.

The opposite approach can be taken as to contact chatter. For example, the last signal change indicates the actual contact lift. Every pulse before that is due to contact chatter; therefore, for contact chatter, the timer 100 can ignore all pulses (or pulse signals) except for the last one.

In various embodiments, the timer 100 can employ a low pass (LP) filter that can remove all pulses (or pulse signals) shorter than 40 µs or other desired signal time length, so care should be taken when dealing with contact chattering and bouncing as signals removed by the low pass filter still appears on the oscilloscope screen.

Accordingly, for open transition (OT) transfer mode, a time measurement can be taken between inside edge signals, such as for example shown in FIG. 6. For closed transition (CT) transfer mode (CT), a time measurement for a transfer operation can be taken between outside edge signals, such as for example shown in FIG. 7.

It is noted that, on the timer 100, the OT transfer mode and the CT transfer mode can use the same hardware and the same software routines; therefore, the accuracy testing for the timer 100 on one of the modes may be sufficient. Furthermore, the accuracy of the time measurement for a timer, such as described herein, has been shown, for example, to be within ±0.2 ms (0° C. and 40° C., 5.2 ms>t<998 ms). In various embodiments, the timer can perform a time measurement when the READY signal is shown. The timer can automatically set the READY signal after a predetermined period, e.g., one second (1 sec) of contact rest of the contactor.

Furthermore, when there is less contact bouncing and chattering, the signal comparison is performed easier and more accurately. To help minimize contact bouncing, multiple contacts of the contactor can be placed in parallel. In addition, signal pulses shorter than 40 µs can be ignored.

Figure 13:
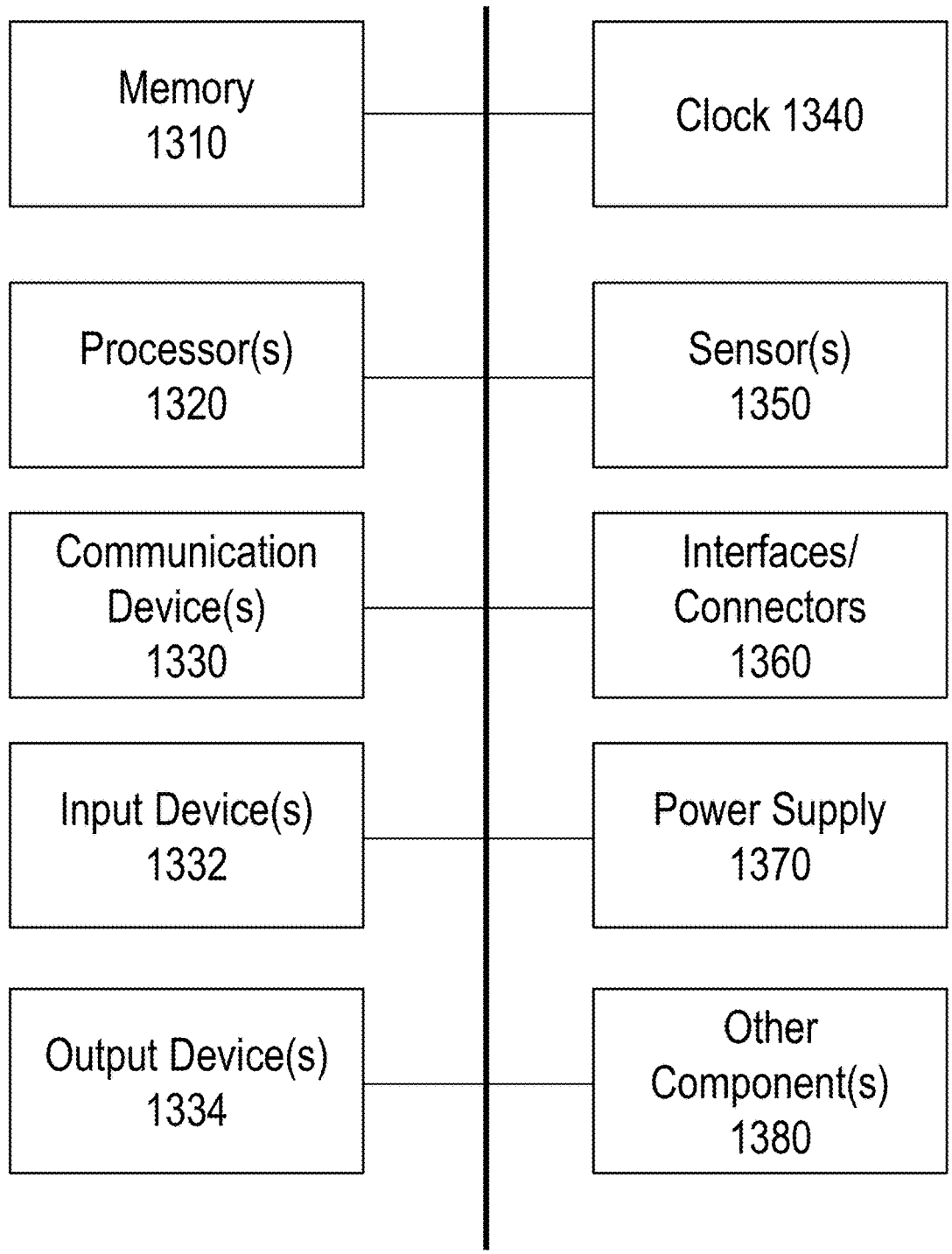
FIG. 13 illustrates example components of a computer-implemented device or system for performing transfer time measurement(s) and other functions, in accordance with embodiments of the present disclosure.

FIG. 13 illustrates example components of a computer-implemented device (or system) 1300 such as a load transfer timer (or timing device) or other device with processing and communication capabilities, for use to monitor electrical systems (or component(s) thereof) and to implement various functions including but not limited to measurement(s) of a load transfer operation, or other functions, in accordance with an embodiment.

The system (or device) 1300 can include memory 1310, processor(s) 1320, communication device(s) 1330, input device(s) 1332, output device(s) 1334, clock 1340, sensor(s) 1350, interface(s)/connector(s) 1360, power supply 1370 and other component(s) 1380, which can be connected via bus(es) 1390 to facilitate supply of power from the power supply 1370 to various components and to facilitate communication between components. The system 1300 also can include power converter circuit(s) to convert the power supply levels from the power supply 1370 to suitable levels for use by components of the system 1300. The clock 1340 can be used to time-stamp data or an event with a time value, and synchronize operations within the device and with remote devices or a system. The communication device 1330 can include transmitters and receivers for conducting wireless communications or wireline communications with other remote devices. The input device(s) 1332 can include user input devices, including a switch, dial, lever, button(s), touchscreen, microphone, and/or other available user devices. The output device(s) 1334 can include output devices, such as display or display device, speaker, LED indicator(s), and/or other available output devices.

The interface(s)/connector(s) 1360 can include input/output interfaces or connectors through which signals may be received or outputted by the system 1300. The interface(s)/connector(s) can include interfaces or connectors for sensing or testing leads.

The memory 1310 can store computer executable code, programs, software, or instructions, which when executed by a processor(s), controls the operations of the system 1300, including the various processes described herein. The memory 1310 can also store other data used by the device 1300 or components thereof to perform the operations described herein. The other data can include but is not limited to time measurements and associated information, timer operation parameter settings, and other data described herein.

The processor(s) 1320, which can interact with the other components of the system 1300, is configured to control or implement the various operations and functions described herein.

The sensor(s) 1350 can be provided, if desired, to measure electrical properties of electrical signals. The sensor 1350 can be a current sensor, voltage sensor or other sensor from which current or voltage or its representative waveform signal(s) can be derived.

The above describes example components of a computer-implemented device such as a timer or other device with processing and communication capability described herein. The computer-implemented device may or may not include all of the components of FIG. 13, and may include other additional components to facilitate operation of the processes and features described herein. For example, the computer-implemented device may also include signal conditioning circuits, and so forth.

It should also be understood that the example embodiments disclosed and taught herein are susceptible to numerous and various modifications and alternative forms. Thus, the use of a singular term, such as, but not limited to, "a" and the like, is not intended as limiting of the number of items. Furthermore, the naming conventions for the various components, functions, characteristics, thresholds, and other elements used herein are provided as examples, and can be given a different name or label. The use of the term "or" is not limited to exclusive "or", but can also mean "and/or".

It will be appreciated that the development of an actual, real commercial application incorporating aspects of the disclosed embodiments will require many implementation specific decisions to achieve the developer's ultimate goal for the commercial embodiment. Such implementation specific decisions may include, and likely are not limited to, compliance with system related, business related, government related and other constraints, which may vary by specific implementation, location and from time to time. While a developer's efforts might be complex and time consuming in an absolute sense, such efforts would nevertheless be a routine undertaking for those of skill in this art having the benefit of this disclosure.

Using the description provided herein, the example embodiments may be implemented as a machine, process, or article of manufacture by using standard programming and/or engineering techniques to produce programming software, firmware, hardware, or any combination thereof.

Any resulting program(s), having computer-readable program code, may be embodied on one or more tangible or non-transitory computer-usable media such as resident memory devices, smart cards or other removable memory devices, or transmitting devices, thereby making a computer program product or article of manufacture according to the embodiments. As such, the terms "article of manufacture" and "computer program product" as used herein are intended to encompass a computer program that exists permanently or temporarily on any computer-usable or storage medium or in any transmitting medium which transmits such a program.

A processor(s), controller(s) or processing unit(s) as described herein can be a processing system, which can include one or more processors, such as CPU, controller, control circuit, ASIC, or other processing unit or circuitry, which controls or performs the operations of the device(s) or system(s), described herein. Memory/storage devices can include, but are not limited to, disks, solid state drives, optical disks, removable memory devices such as smart cards, SIMs, WIMs, semiconductor memories such as RAM, ROM, PROMS, etc. Transmitting mediums or networks include, but are not limited to, transmission via wireline communication, wireless communication (e.g., Radio Frequency (RF) communication, Bluetooth®, Wi-Fi, Li-Fi, etc.), the Internet, intranets, telephone/modem-based network communication, hard-wired/cabled communication network, satellite communication, and other stationary or mobile network systems/communication links.

The flowchart and block diagrams in the Figures illustrate the architecture, functionality and/or operation of possible implementations of various embodiments of the present disclosure. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While particular embodiments and applications of the present disclosure have been illustrated and described, it is to be understood that the present disclosure is not limited to the precise construction and compositions disclosed herein and that various modifications, changes, and variations can be apparent from the foregoing descriptions without departing from the invention as defined in the appended claims.

What is claimed is:

1. A method of measuring a hot-to-hot load transfer time for a transfer switch on an electrical system including a first power source, a second power source and a load, the transfer switch being configured to transfer supply of power to the load from one of the first and second power sources to the other one of the first and second power sources, the method comprising:
   receiving, at a controller, a selection of a transfer mode to be implemented by or through the transfer switch from a plurality of different types of transfer modes, the different types of transfer modes including at least a closed transition transfer mode and an open transition transfer mode;
   monitoring, via the controller, electrical signals from first and second sensing leads or signals derived therefrom to sense a supply state of electrical power from the first and second power sources to the load, each of the first and second sensing leads being connectable or couplable to the electrical system or a component thereof according to the transfer mode being implemented by or through the transfer switch;
   identifying, via the controller, an occurrence of a contact lift and an occurrence of a contact landing, which are associated with a load transfer operation of the transfer switch, from the monitored electrical signals or signals derived therefrom, the contact lift being an operation of the transfer switch which disconnects one of the first and second powers from the load, the contact landing being an operation of the transfer switch which connects the other one of the first and second powers to the load;
   measuring, via the controller, a load transfer time based on a timing of the identified occurrence of the contact lift and the identified occurrence of the contact landing, and the selected transfer mode; and
   outputting via the controller the measured load transfer time
   wherein the open transition transfer mode comprises a load transfer scenario where the one of the first and second power sources is connected to the load, the one of the first and second power sources is then disconnected from the load, and thereafter the other one of the first and second power sources is connected to the load to complete the load transfer operation, and
   the closed transition transfer mode comprises a load transfer scenario where the one of the first and second power sources is connected to the load, the other one of the first and second power sources is then connected to the load, and thereafter the one of the first and second power sources is disconnected from the load to complete the load transfer operation.

2. The method according to claim 1, wherein, for the closed transition transfer mode, one of the first and second sensing leads is connected or coupled to one of the first and second power sources and the other one of the first and second sensing leads is connected or coupled to the other one of the first and second power sources.

3. The method according to claim 1, wherein, for the closed transition transfer mode, the measured load transfer time is a time period from the identified occurrence of contact landing to the identified occurrence of the contact lift.

4. The method according to claim 3, wherein the contact landing is identified as a first signal transition or edge signal from the electrical signals or signals derived therefrom being monitored over time and at or above a defined signal time length when one of the first and second power sources is connected to the load, and after the contact landing, the contact lift is subsequently identified as a last signal transition or edge signal from the electrical signals or signals derived therefrom being monitored over time and at or above the defined signal time length when the other one of the first and second power sources is disconnected from the load.

5. The method according to claim 1, wherein, for the open transition transfer mode, one of the first and second sensing leads is connected or coupled to one of the first and second power sources and the other one of the first and second sensing leads is connected or coupled to the load.

6. The method according to claim 1, wherein, for the open transition transfer mode, the measured load transfer time is a time period from the identified occurrence of the contact lift to the identified occurrence of the contact landing.

7. The method according to claim 6, wherein the contact lift is identified as a last signal transition from the electrical signals being monitored over time and at or above a defined signal time length when one of the first and second power sources, which is connected to the load, is disconnected from the load, and after the contact lift, the contact landing is subsequently identified as a first signal transition from the electrical signals being monitored over time and at or above the defined signal time length when the other of the first and second power sources is connected to the load.

8. The method according to claim 1, wherein the monitored electrical signals from the first and second sensing leads or signals derived therefrom correspond to or represent a potential voltage difference across the first and second sensing leads.

9. The method according to claim 1, further comprising:
filtering the monitored electrical signals or signals derived therefrom to filter out signals below a defined signal time length or a signal time length of 40 µ-sec,
wherein the identifying an occurrence of a contact lift and an occurrence of a contact landing ignores signals associated with contact bounce from the monitored electrical signals or signals derived therefrom when identifying for an occurrence of a contact landing and ignores signals associated with contact chatter when identifying for a contact lift.

10. The method according to claim 1, wherein an order in which the identifying operation identifies the occurrence of the contact lift and the occurrence of the contact landing is changed according to the selected transfer mode.

11. A system for measuring a hot-to-hot load transfer time for a transfer switch on an electrical system including a first power source, a second power source and a load, the transfer switch being configured to transfer supply of power to the load from one of the first and second power sources to the other one of the first and second power sources, the system comprising:
first and second sensing leads connectable or couplable to the electrical system or a component thereof to monitor a supply of power from the first and second power sources to the load;
a mode selector for selecting a transfer mode to be implemented by or through the transfer switch from a plurality of different types of transfer modes, the different types of transfer modes including at least a closed transition transfer mode and an open transition transfer mode; and
a controller, coupled to a memory, configured to:
monitor electrical signals from first and second sensing leads or signals derived therefrom to sense a supply state of electrical power from the first and second power sources to the load, each of the first and second sensing leads being connectable or couplable to the electrical system or a component thereof according to the transfer mode being implemented by or through the transfer switch;
identify an occurrence of a contact lift and an occurrence of a contact landing, which are associated with a load transfer operation of the transfer switch, from the monitored electrical or signals derived therefrom, the contact lift being an operation of the transfer switch which disconnects one of the first and second powers from the load, the contact landing being an operation of the transfer switch which connects the other one of the first and second powers to the load;
measure a load transfer time based on a timing of the identified occurrence of the contact lift and the identified occurrence of the contact landing, and the selected transfer mode; and
output the measured load transfer time
wherein the open transition transfer mode comprises a load transfer scenario where the one of the first and second power sources is connected to the load, the one of the first and second power sources is then disconnected from the load, and thereafter the other one of the first and second power sources is connected to the load to complete the load transfer operation, and
the closed transition transfer mode comprises a load transfer scenario where the one of the first and second power sources is connected to the load, the other one of the first and second power sources is then connected to the load, and thereafter the one of the first and second power sources is disconnected from the load to complete the load transfer operation.

12. The system according to claim 11, wherein, for the closed transition transfer mode, one of the first and second sensing leads is connected or coupled to one of the first and second power sources and the other one of the first and second sensing leads is connected or coupled to the other one of the first and second power sources.

13. The system according to claim 11, wherein, for the closed transition transfer mode, the measured load transfer time is a time period from the identified occurrence of contact landing to the identified occurrence of the contact lift.

14. The system according to claim 13, wherein the contact landing is identified as a first signal transition or edge signal from the electrical signals or signals derived therefrom being monitored over time and at or above a defined signal time length when one of the first and second power sources is connected to the load and after the contact landing, the contact lift is subsequently identified as a last signal transition or edge signal from the electrical signals or signals derived therefrom being monitored over time and at or above the defined signal time length when the other one of the first and second power sources is disconnected from the load.

15. The system according to claim 11, wherein, for the open transition transfer mode, one of the first and second sensing leads is connected or coupled to one of the first and second power sources and the other one of the first and second sensing leads is connected or coupled to the load.

16. The system according to claim 11, wherein, for the open transition transfer mode, the measured load transfer time is a time period from the identified occurrence of the contact lift to the identified occurrence of the contact landing.

17. The system according to claim 16, wherein the contact lift is identified as a last signal transition from the electrical signals being monitored over time and at or above a defined signal time length when one of the first and second power sources, which is connected to the load, is disconnected from the load, and after the contact lift, the contact landing is subsequently identified as a first signal transition from the electrical signals being monitored over time and at or above the defined signal time length when the other of the first and second power sources is connected to the load.

18. The system according to claim 11, wherein the monitored electrical signals from the first and second sensing leads or signals derived therefrom correspond to or represent a potential voltage difference across the first and send sensing leads.

19. The system according to claim 11, further comprising:
a filter for filtering the monitored electrical signals or signals derived therefrom to filter out signals below a defined signal time length or a signal time length of 40 μ-sec,
wherein the controller is configured to ignore signals associated with contact bounce from the monitored electrical signals or signals derived therefrom when identifying for an occurrence of a contact landing and is configured to ignore signals associated with contact chatter when identifying for a contact lift.

20. The system according to claim 11, wherein an order in which the controller identifies the occurrence of the contact lift and the occurrence of the contact landing is changed according to the selected transfer mode.

21. The system according to claim 11, comprising a timing device that includes therein the first and second sensing leads, the mode selector and the controller; the mode selector comprises a user input device which is operable by a user to select the transfer mode; and the timing device further includes an output device configured to output the measured load time to the user.

22. A non-transitory computer medium storing computer executable code, which when executed by one or more processors, implements a method of measuring a hot-to-hot load transfer time for a transfer switch on an electrical system including a first power source, a second power source and a load, the transfer switch being configured to transfer supply of power to the load from one of the first and second power sources to the other one of the first and second power sources, the method comprising:
receiving a selection of a transfer mode to be implemented by or through the transfer switch from a plurality of different types of transfer modes, the different types of transfer modes including at least a closed transition transfer mode and an open transition transfer mode;
monitoring electrical signals from first and second sensing leads or signals derived therefrom to sense a supply state of electrical power from the first and second power sources to the load, each of the first and second sensing leads being connectable or couplable to the electrical system or a component thereof according to the transfer mode being implemented by or through the transfer switch;
identifying an occurrence of a contact lift and an occurrence of a contact landing, which are associated with a load transfer operation of the transfer switch, from the monitored electrical signals or signals derived therefrom, the contact lift being an operation of the transfer switch which disconnects one of the first and second powers from the load, the contact landing being an operation of the transfer switch which connects the other one of the first and second powers to the load;
measuring a load transfer time based on a timing of the identified occurrence of the contact lift and the identified occurrence of the contact landing, and the selected transfer mode; and
outputting the measured load transfer time
wherein the open transition transfer mode comprises a load transfer scenario where the one of the first and second power sources is connected to the load, the one of the first and second power sources is then disconnected from the load, and thereafter the other one of the first and second power sources is connected to the load to complete the load transfer operation, and
the closed transition transfer mode comprises a load transfer scenario where the one of the first and second power sources is connected to the load, the other one of the first and second power sources is then connected to the load, and thereafter the one of the first and second power sources is disconnected from the load to complete the load transfer operation.

\* \* \* \* \*